(12) United States Patent
Ono et al.

(10) Patent No.: US 6,356,331 B1
(45) Date of Patent: Mar. 12, 2002

(54) LIQUID CRYSTAL DISPLAY DEVICE

(75) Inventors: Kikuo Ono, Mobara; Makoto Yoneya, Hitachinaka; Tsunenori Yamamoto, Hitachi; Junichi Hirakata, Chiba; Yoshiaki Nakayoshi, Mobara, all of (JP)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 09/658,663

(22) Filed: Sep. 8, 2000

(30) Foreign Application Priority Data

Sep. 21, 1999 (JP) ............................................ 11-266833

(51) Int. Cl.$^7$ ............................................ G02F 1/1343
(52) U.S. Cl. ........................ 349/141; 349/110; 349/143; 349/38
(58) Field of Search ................................. 349/110, 141, 349/143, 38

(56) References Cited

U.S. PATENT DOCUMENTS 6,147,731 A * 11/2000 Shibahara ................... 349/110

* cited by examiner

Primary Examiner—Kenneth Parker
Assistant Examiner—David Chung

(57) ABSTRACT

A liquid crystal display device includes a pixel electrode and a counter electrode which are respectively disposed in different layers in a liquid crystal-side pixel area of one of transparent substrates disposed to oppose each other with a liquid crystal interposed therebetween. The counter electrode causes an electric field having a component parallel to the transparent substrates to be generated between the counter electrode and the pixel electrode. One of the pixel electrode and the counter electrode is formed on a side closer to the liquid crystal than the other electrode is to the liquid crystal, and the other electrode is formed of a transparent electrode extended outwardly from at least a periphery of an area on which the one electrode is superposed. In the liquid crystal display device, a conductive layer which is capacitive-coupled to each of the pixel electrode and the counter electrode is formed between the pixel electrode and the counter electrode in order to reduce the drive voltage of the liquid crystal display device and to reduce a load capacitance which occurs between the pixel electrode and the counter electrode.

7 Claims, 33 Drawing Sheets

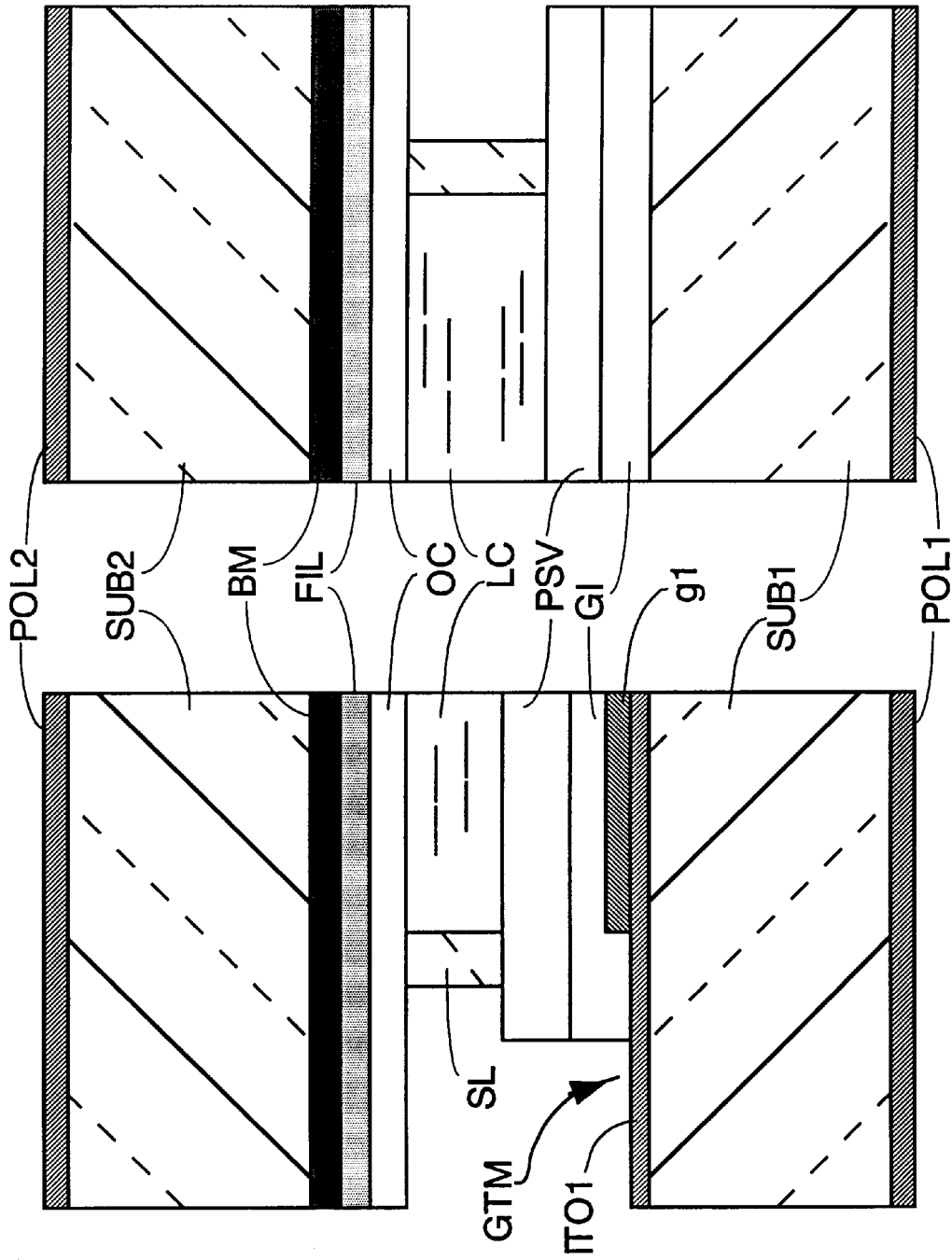

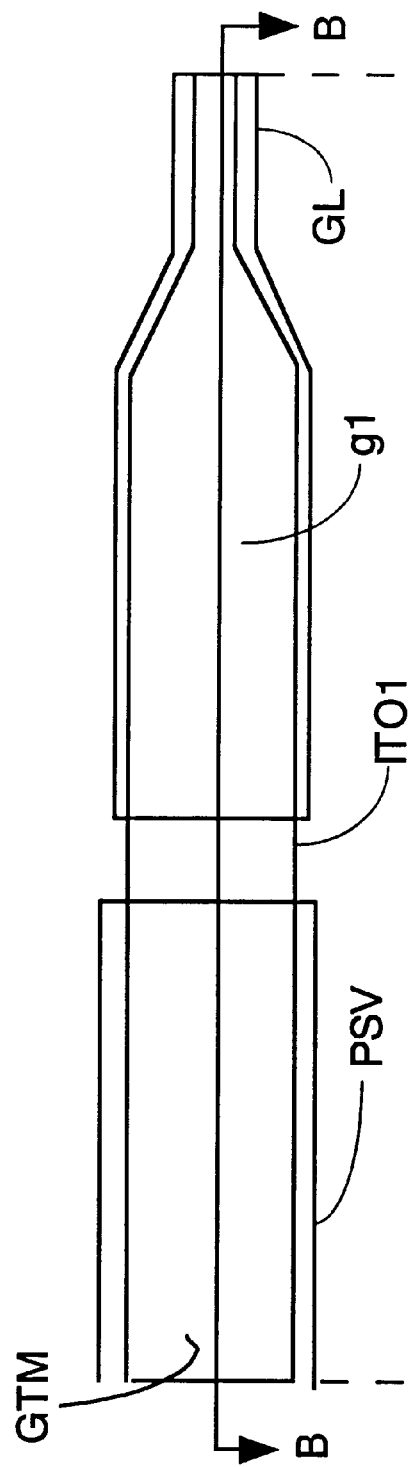
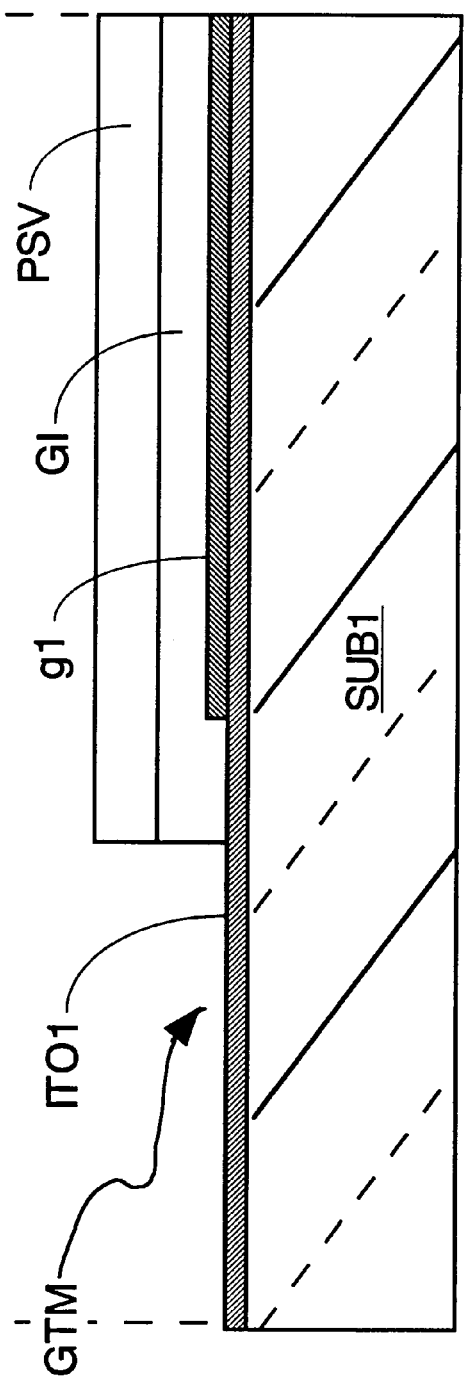

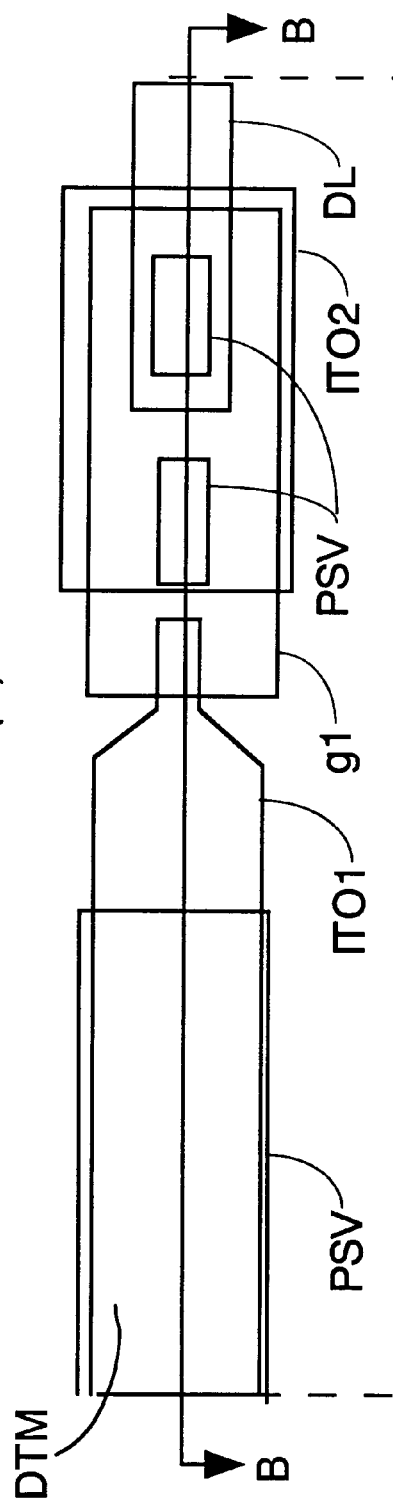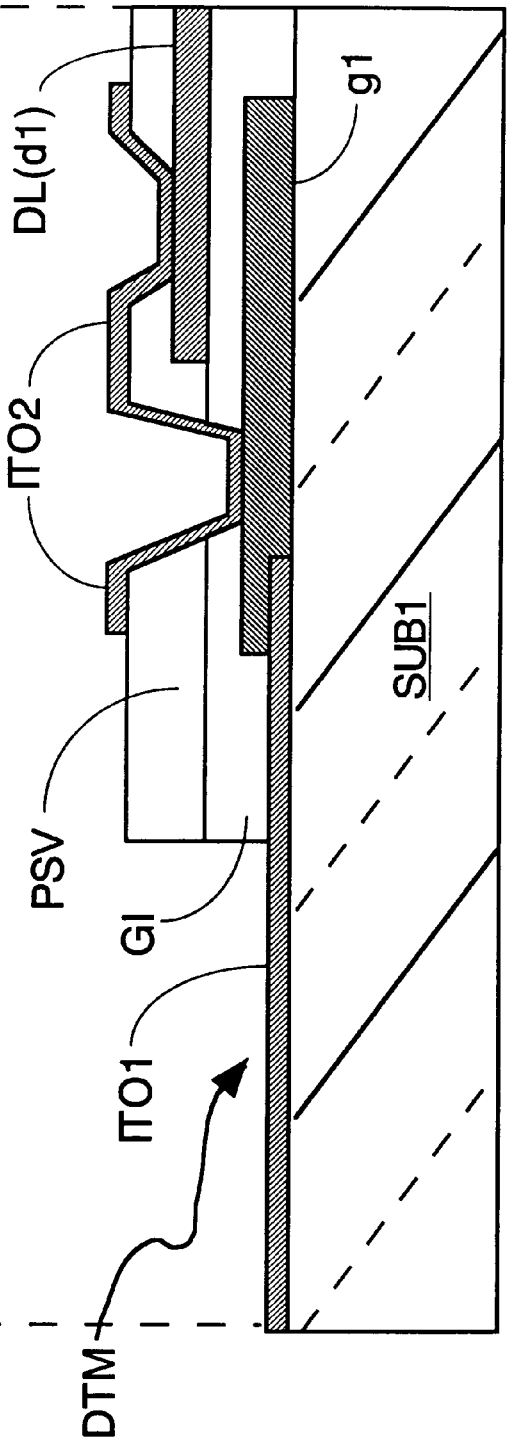
FIG. 8(A)
FIG. 8(B)

LIQUID CRYSTAL DISPLAY DEVICE

BACKGROUND OF THE INVENTION

1. Field of the Invention

The present invention relates to a liquid crystal display device and, more particularly, to a liquid crystal display device which is called a lateral electric field type.

2. Description of the Related Art

A liquid crystal display device which is called a lateral electric field type has a construction in which a pixel electrode and a counter electrode which causes an electric field (a lateral electric field) having a component parallel to transparent substrates to be generated between the counter electrode and the pixel electrode are formed in each liquid crystal-side pixel area of one of the transparent substrates disposed to oppose each other with a liquid crystal interposed therebetween.

The lateral electric field type of liquid crystal display device is constructed so that the amount of light to be transmitted through the area between the pixel electrode and the counter electrode is controlled by the driving of the liquid crystal to which the electric field is applied.

Such a liquid crystal display device is known as a type which is superior in so-called wide viewing angle characteristics which enable a displayed image to be unchanged even when its display surface is observed from an oblique direction.

In this kind of liquid crystal display device, the pixel electrode and the counter electrode have so far been formed of a conductive layer which does not transmit light therethrough.

In recent years, a liquid crystal display device constructed in the following manner has been known: a counter electrode made of a transparent electrode is formed over the entire area of a pixel area except the periphery thereof, and strip-shaped pixel electrodes are formed on the counter electrode with an insulating film interposed therebetween, in such a manner as to be extended in one direction (a first direction) and to be juxtaposed in a direction (a second direction) intersecting with the one direction.

The liquid crystal display device having this construction causes a lateral electric field to be generated between each of the pixel electrodes and the counter electrode, and is still superior in wide viewing angle characteristics and is greatly improved in aperture ratio.

Incidentally, this art is described, for example, in SID 99 DIGEST: pp. 202–205.

SUMMARY OF THE INVENTION

However, the structure of the liquid crystal display device having this construction is such that, as described above, the pixel electrode and the counter electrode which causes an electric field to be generated between the pixel electrode and the counter electrode are formed as different layers with the liquid crystal interposed therebetween, so that the electric field is distributed in a larger amount in a portion away from the liquid crystal than on the side of the liquid crystal.

It has been pointed out, therefore, that in order to generate an electric field fully distributed in the liquid crystal, it is necessary to apply a comparatively large voltage (drive voltage) between the pixel electrode and the counter electrode.

In addition, it has been pointed out that since the counter electrode and the pixel electrode are superposed on each other over a large area with the insulating film interposed therebetween, a load increases during the driving of a thin film transistor (switching element) interposed between a video signal line and the pixel electrode.

The invention has been made on the basis of the above-described circumstances, and aims to provide a liquid crystal display device in which its drive voltage can be reduced.

The invention also aims to provide a liquid crystal display device in which a load (load capacitance) can be reduced during the driving of a thin film transistor.

A representative aspect of the invention disclosed in the present application will be described below in brief.

A liquid crystal display device according to the invention includes a pixel electrode and a counter electrode which are respectively disposed in different layers in a liquid crystal-side pixel area of one of transparent substrates disposed to oppose each other with a liquid crystal interposed therebetween. The counter electrode causes an electric field having a component parallel to the transparent substrates to be generated between the counter electrode and the pixel electrode. One of the pixel electrode and the counter electrode is formed as a layer closer to the liquid crystal than the other electrode is to the liquid crystal, and the other electrode, is formed as a transparent electrode extended outwardly from at least a periphery of an area on which the one electrode is superposed, and a conductive layer is formed which is capacitive-coupled between the pixel electrode and the counter electrode.

In the liquid crystal display device constructed in this manner, since the conductive layer is capacitive-coupled between the pixel electrode and the counter electrode, an electric field can be generated between the one electrode and the other electrode, and this electric field has a component parallel to the transparent substrates.

Moreover, the potentials of the capacitive-coupled electrodes are close to each other, and the capacitance itself between the electrodes lowers.

Accordingly, part of the electric field occurring between the one electrode and the other electrode is distributed to an electric field occurring between the one electrode and the conductive layer, whereby the distribution of the entire electric field can be shifted to a side closer to the liquid crystal.

This fact makes it possible to improve the efficiency of the electric field required for controlling the optical transmissivity of the liquid crystal in the case of a constant drive voltage. From another point of view, it is possible to achieve the advantage of reducing the drive voltage in the case where the electric field suffices to control the optical transmissivity of the liquid crystal.

In addition, the potential difference between the conductive layer and the other electrode which are capacitive-coupled to each other is decreased by a divided capacitance potential value, whereby it is possible to achieve the advantage that the load capacitance of the thin film transistor can be decreased.

These and other objects, features and advantages of the present invention will become more apparent from the following description when taken in conjunction with the accompanying drawings.

BRIEF DESCRIPTION OF THE DRAWINGS

FIG. 2 is a cross-sectional view taken along line 3-3 of FIG. 1;

FIGS. 6(a) and 6(b) are cross-sectional views showing the construction of a sealing material which secures each transparent substrate of the liquid crystal display panel and seals a liquid crystal;

FIGS. 7(a) and 7(b) are views showing the construction of one embodiment of a gate signal terminal of the liquid crystal display device according to the invention;

FIGS. 8(a) and 8(b) are views showing the construction of one embodiment of a drain signal terminal of the liquid crystal display device according to the invention;

DETAILED DESCRIPTION

Embodiments of the liquid crystal display device according to the present invention will be described below.

<Embodiment 1>

<<Construction of Pixel>>

Figure 1:
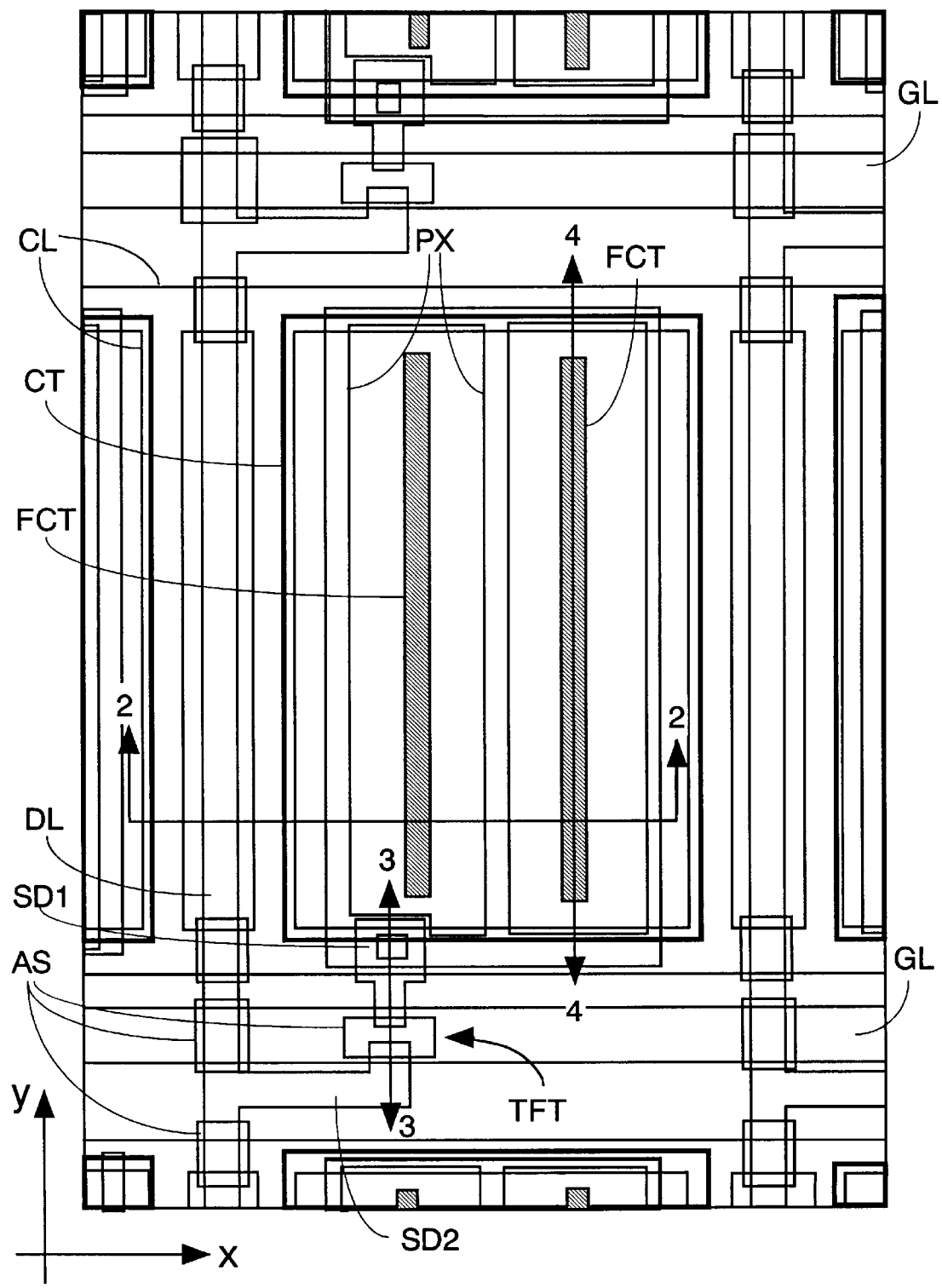
FIG. 1 is a plan view showing one embodiment of a pixel area of a liquid crystal display device according to the invention.

FIG. 1 is a view of the construction of a pixel area of a liquid crystal display device (panel) according to the present invention, and is a plan view as viewed from the liquid-crystal side of either one of a pair of transparent substrates disposed to oppose each other with a liquid crystal interposed therebetween.

Figure 2:
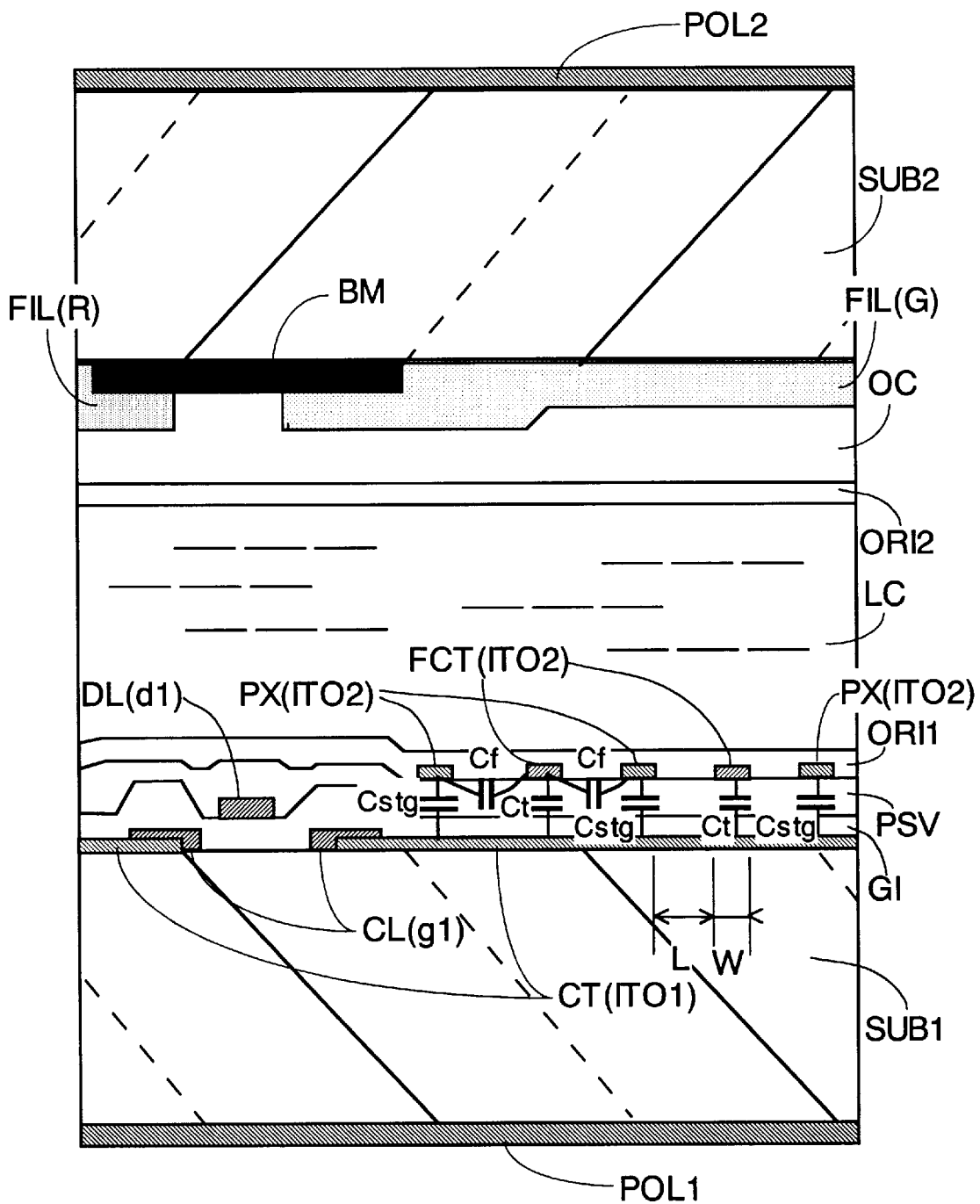
FIG. 2 is a cross-section view taken along line 2—2 of FIG. 1.
Figure 3:
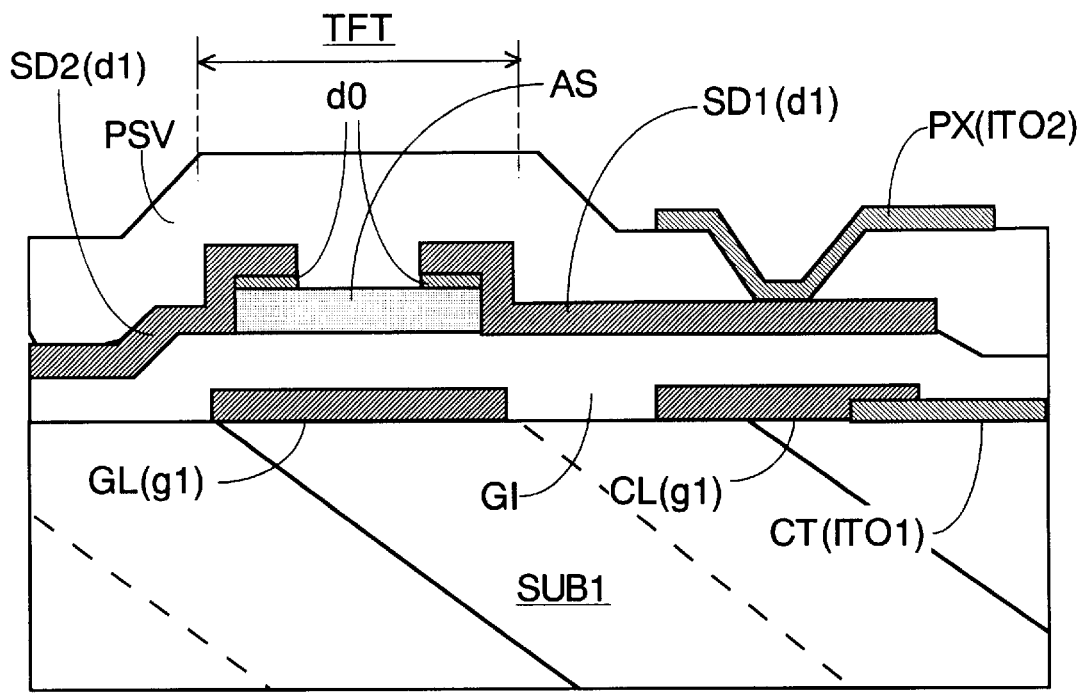
Figure 4:
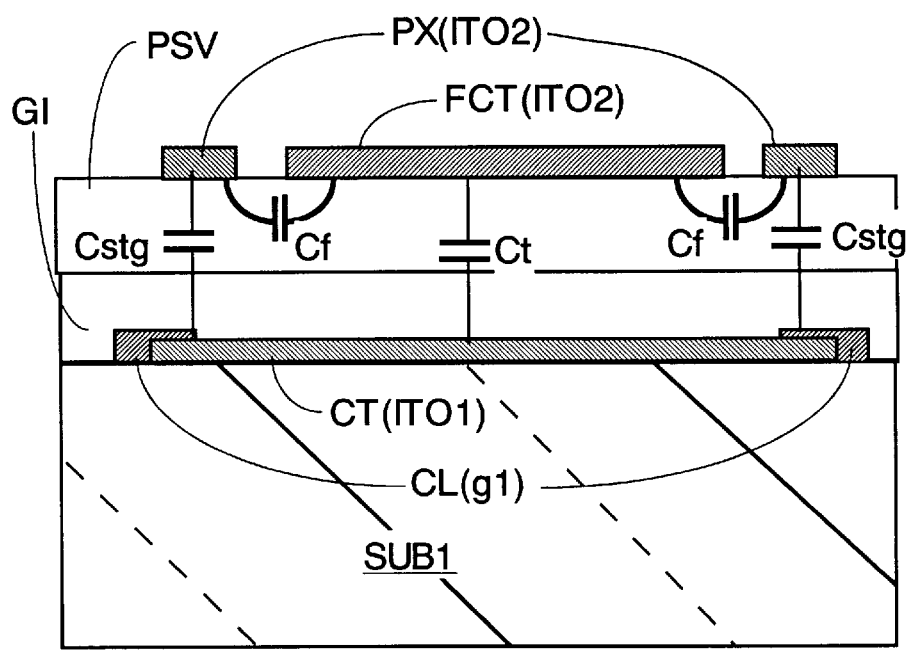
FIG. 4 is a cross-sectional view taken along line 4—4 of FIG. 1.

FIG. 2 is a cross-sectional view taken along line 2—2 of FIG. 1, FIG. 3 is a cross-sectional view taken along line 3—3 of FIG. 1, and FIG. 4 is a cross-sectional view taken along line 4—4 of FIG. 1.

Referring first to FIG. 1, gate signal lines GL disposed to be extended in a horizontal direction of FIG. 1 (x direction in the Figure, hereinafter) and to be juxtaposed in a vertical direction of FIG. 1 (y direction in the Figure, hereinafter) are formed of, for example, chromium (Cr). The pixel area is surrounded by these gate signal lines GL and drain signal lines DL which will be described later.

A counter electrode CT for generating an electric field between the counter electrode CT and a pixel electrode which will be described later is formed in this pixel area. This counter electrode CT is formed over the whole of the pixel area except the periphery thereof, and is made of, for example, ITO (Indium-Tin-Oxide) which is a transparent conductor.

This counter electrode CT has a counter voltage signal line CL formed to be connected to the counter electrode CT in such a manner as to surround the entire periphery of the counter electrode CT. This counter voltage signal line CL is electrically connected to each of the counter voltage signal lines CL which are similarly formed to be connected to the respective counter electrodes in the right- and left-hand pixel areas as viewed in FIG. 1 (pixel areas disposed along the gate signal lines GL).

This counter voltage signal line CL is formed of an opaque material made of, for example, chromium (Cr). In this case, even if an electric field which acts as noise occurs between either of the drain signal lines DL which will be described later and the adjacent one of the sides of the counter electrode CT, that portion is shielded from light by the counter voltage signal line CL, whereby it is possible to solve a problem which is undesirable in terms of display quality.

This fact also means that it is possible to solve a problem due to an electric field (noise) which occurs between either of the gate signal lines GL and the adjacent one of the sides of the counter electrode CT.

In addition, as described above, since the material of the counter voltage signal lines CL is the same as that of the gate signal lines GL, the counter voltage signal lines CL and the gate signal lines GL can be formed in the same process, whereby it is possible to achieve the advantage of preventing an increase in the number of manufacturing steps.

An insulating film GI made of; for example, SiN is formed to cover the upper surface of a transparent substrate SUB1 over which the counter electrodes CT, the counter voltage signal lines CL and the gate signal lines GL are formed.

This insulating film GI has the function of an interlayer insulating film between the counter electrodes CT and the gate signal lines GL with respect to the drain signal lines DL which will be described later, the function of a gate insulating film in an area in which a thin film transistor TFT which will be described later is formed, and the function of a dielectric film in an area in which a capacitance element Cstg which will be described later is formed.

The thin film transistor TFT is formed to be superposed on part of the gate signal line GL (refer to the bottom left portion of FIG. 1), and a semiconductor layer AS made of, for example, a-Si is formed on this portion of the insulating film GI.

A source electrode SD1 and a drain electrode SD2 are formed on the upper surface of the semiconductor layer AS, whereby a MIS type transistor having an inverted-staggered structure which uses part of the gate signal line GL as its gate electrode is formed. These source electrode SD1 and drain electrode SD2 are formed at the same time as the drain signal lines DL.

Specifically, the drain signal lines DL are formed to be extended in the x direction of FIG. 1 and to be juxtaposed in the y direction of FIG. 1. Part of each of the drain signal lines DL is formed to be extended to the surface of the semiconductor layer AS to constitute the drain electrode SD2 of the thin film transistor TFT.

The source electrode SD1 is formed at the time of formation of the drain signal line DL, and this source electrode SD1 is formed to be extended into the pixel area, thereby integrally forming a contact portion which provides connection between the thin film transistor TFT and a pixel electrode PX which will be described later.

Incidentally, as shown in FIG. 3, a contact layer d0 which is doped with, for example, an n type impurity is formed at the interface between the source electrode SD1 and the drain electrode SD2 of the semiconductor layer AS.

This contact layer d0 is formed by forming an n type impurity-doped layer over the entire surface of the semiconductor layer AS, and, after forming the source electrode SD1 and the drain electrode SD2, etching the n type impurity-doped layer on the portion of the surface of the semiconductor layer AS that is exposed between these electrodes SD1 and SD2, by using these electrodes SD1 and SD2 as a mask.

Incidentally, in Embodiment 1, the semiconductor layer AS is formed not only in the area in which the thin film transistor TFT is formed, but also at the intersection of the drain signal line DL and the gate signal line GL and at the intersection of the drain signal line DL and the counter voltage signal line CL. This construction is intended to strengthen the function of the interlayer insulating film.

A protective film PSV which is made of for example, SiN and covers the thin film transistor TFT is formed over the surface of the transparent substrate SUB1 on which the thin film transistor TFT is formed in this manner. This construction is intended to prevent the thin film transistor TFT from coming into direct contact with and the liquid crystal.

Furthermore, the pixel electrode PX and a floating conductive layer FCT which are made of a transparent conductive film of, for example, ITO are formed over the upper surface of the protective film PVS.

Specifically, in Embodiment 1, three pixel electrodes PX are formed to be superposed on the counter electrode CT, and are also formed to be extended in the x direction of FIG. 1 and to be equidistantly juxtaposed in the y direction of FIG. 1. The same-side ends of the three pixel electrodes PX are connected to each by a layer made of the same material which are formed to be extended in the x direction of FIG. 1.

In this case, the layer made of the same material that is located at the bottom ends of the three pixel electrodes PX is connected to the contact portion of the source electrode SD1 of the thin film transistor TFT through a contact hole formed in the protective film PSV. The layer made of the same material that is located at the top ends of the three pixel electrodes PX is superposed on the counter voltage signal line CL to form the capacitance element Cstg which uses the insulating film GI and the protective film PSV as its dielectric film.

This capacitance element Cstg is formed for purposes such as storing a video signal in the pixel electrodes PX for a comparatively long period even if the thin film transistor TFT is turned off after the video signal from the drain signal line DL is applied to the pixel electrodes PX via the thin film transistor TFT.

The conductive layer FCT which is disposed to be extended in the y direction of FIG. 1 is formed between each of the pixel electrodes PX without being connected to any other electrode. Specifically, this conductive layer FCT does not have a construction to which to apply a signal (voltage), and is formed in a floating state.

The conductive layer FCT is made of, for example, an ITO film, and functions as a part of the counter electrode CT.

Specifically, since, as shown in FIG. 2, the conductive layers FCT are capacitive-coupled between the counter electrode CT and each of the pixel electrodes PX, an electric field occurs between each of the pixel electrodes PX and the conductive layer FCT, and this electric field has a component parallel to the transparent substrate SUB1.

Thus, part of an electric field which occurs between each of the pixel electrode PX and the counter electrode CT is distributed to an electric field which occurs between each of the pixel electrodes PX and the conductive layer FCT, so that the distribution of all the electric fields can be shifted to a side closer to the liquid crystal.

This fact makes it possible to improve the efficiency of the electric fields required for controlling the optical transmissivity of the liquid crystal in the case of a constant drive voltage, and provides the advantage of reducing the drive voltage in the case where the electric fields suffice to control the optical transmissivity of the liquid crystal.

Accordingly, by forming the conductive layers FCT above the counter electrode CT, i.e., on the side closer to the liquid crystal, it is possible to increase the effect of the conductive layers FCT.

In addition, the potential of each of the conductive layers FCT is determined by the divided capacitance potential value between the counter electrode CT and the adjacent pixel electrode PX, whereby the potential of each of the conductive layers FCT becomes closer to that of the counter electrode CT and a capacitance Ct of the pixel is decreased compared to the holding capacitance Cstg.

On the basis of this fact, in Embodiment 1, the conductive layers FCT are formed as the same layer as the pixel electrodes PX. However, it goes without saying that these layers may be formed as different layers in such a manner that the pixel electrodes PX are formed as an upper layer and the conductive layers FCT as a lower layer.

An alignment layer ORI1 which covers the pixel electrodes PX and the conductive layers FCT is formed over the surface of the transparent substrate SUB1 over which the pixel electrodes PX and the conductive layers FCT are formed. This alignment layer ORI1 is a layer which is in direct contact with the liquid crystal and determines the initial alignment direction of the liquid crystal.

<<Filter Substrate>>

The transparent substrate SUB1 constructed in this manner is called a TFT substrate, and a transparent substrate disposed to oppose the thin film transistor TFT with the liquid crystal interposed therebetween is called a filter substrate.

As shown in FIG. 2, on the liquid-crystal-LC-side surface of the filter substrate, a black matrix BM is formed to separate the pixel areas from one another, and a filter is formed to cover each aperture of the black matrix BM that determines a substantial pixel area.

An overcoat layer OC made of, for example, a resin layer is formed to cover the black matrix BM and the filter, and an alignment layer ORI2 is formed on the overcoat layer OC.

<<Entire Construction of Liquid Crystal Display Panel>>

Figure 5:
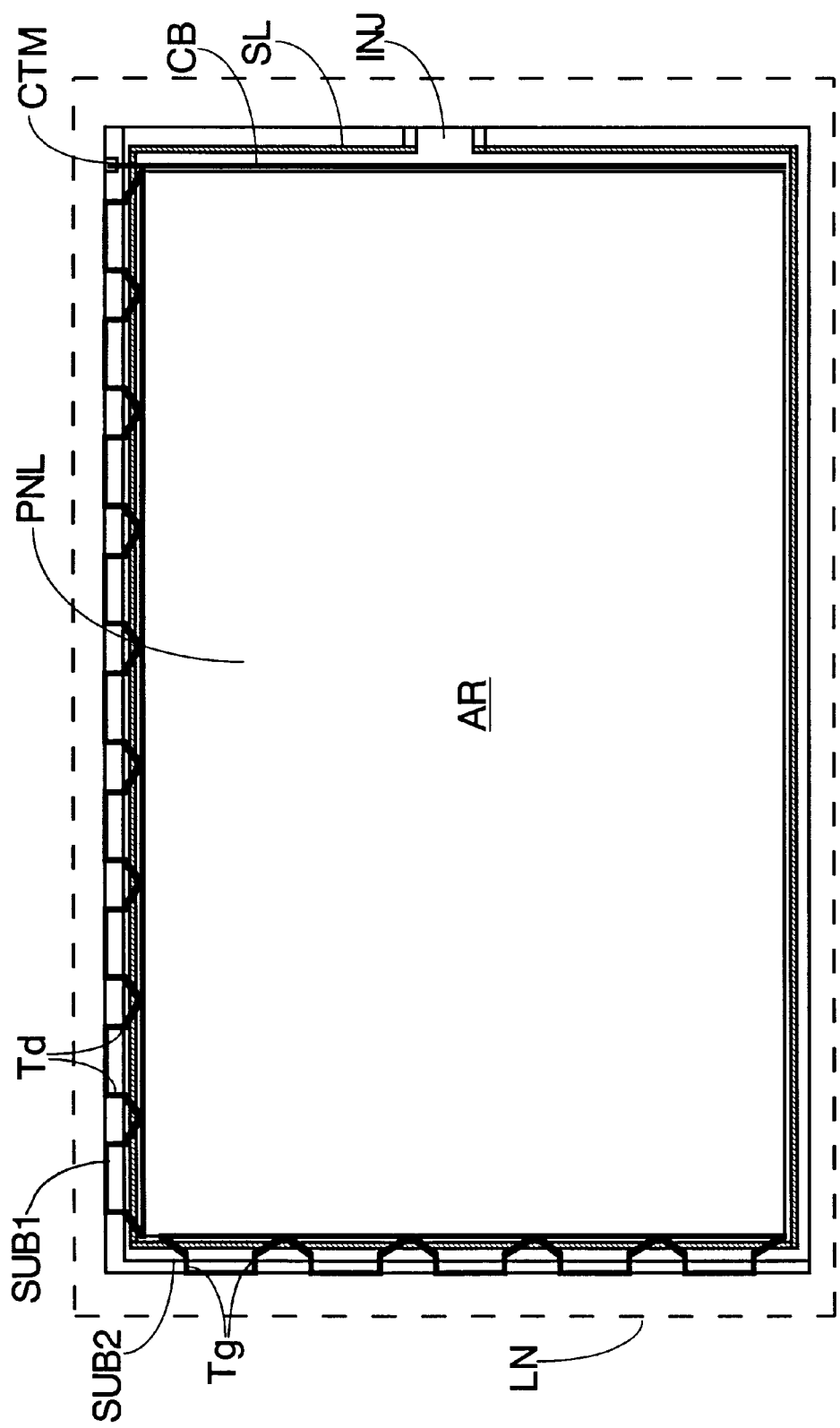
FIG. 5 is a plan view showing the external appearance of a liquid crystal display panel incorporated in the liquid crystal display device according to the invention.

FIG. 5 is a view of the entire construction of the liquid crystal panel, showing a display area AR constructed of an assembly of pixel areas arranged in matrix form.

A transparent substrate SUB2 is formed to be slightly smaller than the transparent substrate SUB1, and the right and bottom sides (as viewed in FIG. 5) of the transparent substrate SUB2 are disposed to be approximately in flush with the corresponding sides of the transparent substrate SUB1.

Accordingly, areas which are not covered with the transparent substrate SUB2 are respectively formed along the left and top sides (as viewed in FIG. 5) of the transparent substrate SUB1, and gate signal terminals Tg and drain signal terminals Td are formed in the respect areas. The gate signal terminals Tg are formed for supplying scanning signals to the respective gate signal lines GL, while the drain signal terminals Td are formed for supplying video signals to the respective drain signal lines DL.

The transparent substrate SUB2 is secured to the transparent substrate SUB1 by a sealing material SL formed along the periphery of the transparent substrate SUB2, and this sealing material SL also has the function of a sealing material for sealing the liquid crystal between the transparent substrates SUB1 and SUB2.

FIGS. 6(a) and 6(b) show that the liquid crystal interposed between the transparent substrates SUB1 and SUB2 is sealed by the sealing material SL.

A liquid crystal filling port INJ is disposed in a portion (the right side of FIG. 5) of the sealing material SL, and after the space between the transparent substrates SUB1 and SUB2 has been filled with the liquid crystal through the liquid crystal filling port INJ, the liquid crystal filling port INJ is sealed by a liquid crystal sealing material (not shown).

<<Gate Signal Terminal>>

FIGS. 7(a) and 7(b) are views showing the construction of one of gate signal terminals GTM through to supply scanning signals to the respective gate signal lines GL. FIG. 7(a) is a plan view, and FIG. 7(b) is a cross-sectional view taken along line B—B of FIG. 7(a).

Referring to FIGS. 7(a) and 7(b), the gate signal terminal GTM made of, for example, an ITO film ITO1 is formed on the transparent substrate SUB1. The gate signal terminals GTM are formed at the same time as the counter electrodes CT.

The reason why the ITO film ITO1 is used as the material of the gate signal terminal GTM is to prevent electrolytic corrosion from easily occurring.

The gate signal line GL is formed to cover the end of the gate signal GTM that is located on the side of the gate signal line GL.

The insulating film GI and the protective film PSV are stacked in that order to cover these gate signal terminal GTM and the gate signal line GL, and part of the gate signal terminal GTM is exposed in an opening formed in the protective film PSV and the insulating film GI.

Incidentally, the insulating film GI and the protective film PSV are formed as extended portions of those formed in the display area AR.

<<Drain Signal Terminal>>

FIGS. 8(a) and 8(b) are views showing the construction of one of drain signal terminals DTM through to supply scanning signals to the respective gate signal lines GL. FIG. 8(a) is a plan view, and FIG. 8(b) is a cross-sectional view taken along line B—B of FIG. 8(a).

Referring to FIGS. 8(a) and 8(b), the drain signal terminal DTM formed on the transparent substrate SUB1 is made of the ITO film ITO1 which has reliability against electrolytic corrosion. This ITO film ITO1 is formed at the same time as the counter electrodes CT.

The drain signal terminal DTM is connected to the drain signal line DL formed on the insulating film GI. However, if a contact hole is formed in the insulating film GI to connect the drain signal terminal DTM to the drain signal line DL, the following problem will occur.

Specifically, the insulating film GI made of SiN, which is formed on the ITO film, suffers a white cloudiness in a portion which is in contact with the ITO film, and if a contact hole is formed in that portion, the hole will be formed in an inversely tapered shape, and there will remain a possibility that a defect occurs in the connection between drain signal terminal DTM and the drain signal line DL.

For this reason, as shown in FIGS. 8(a) and 8(b), a metal layer g1 made of, for example, Cr is formed to be superposed on the end of the drain signal terminal DTM, and a contact hole is formed in the insulating film GI formed on the metal layer g1.

The formation of the contact hole is carried out after the protective film PSV has been formed on the insulating film GI, so that the number of manufacturing steps can be reduced. Accordingly, the connection between the drain signal line DL and the metal layer g1 is provided by an ITO film ITO2 formed at the same time as the pixel electrode PX, through the contact hole formed in the protective film PVS.

Although reference has been made to the case where Cr is used for the metal layer g1, Al or an Al-containing material may also be used. In this case, since the metal layer g1 is easily oxidized on its surface in contact with the ITO film as described above, the metal layer g1 may also be formed as a three-layer structure, such as Ti/Al/Ti, in which high melting point metal layers are respectively provided as its upper and lower layers so that good connection can be ensured.

<<Counter Voltage Signal Terminal>>

Figure 9:
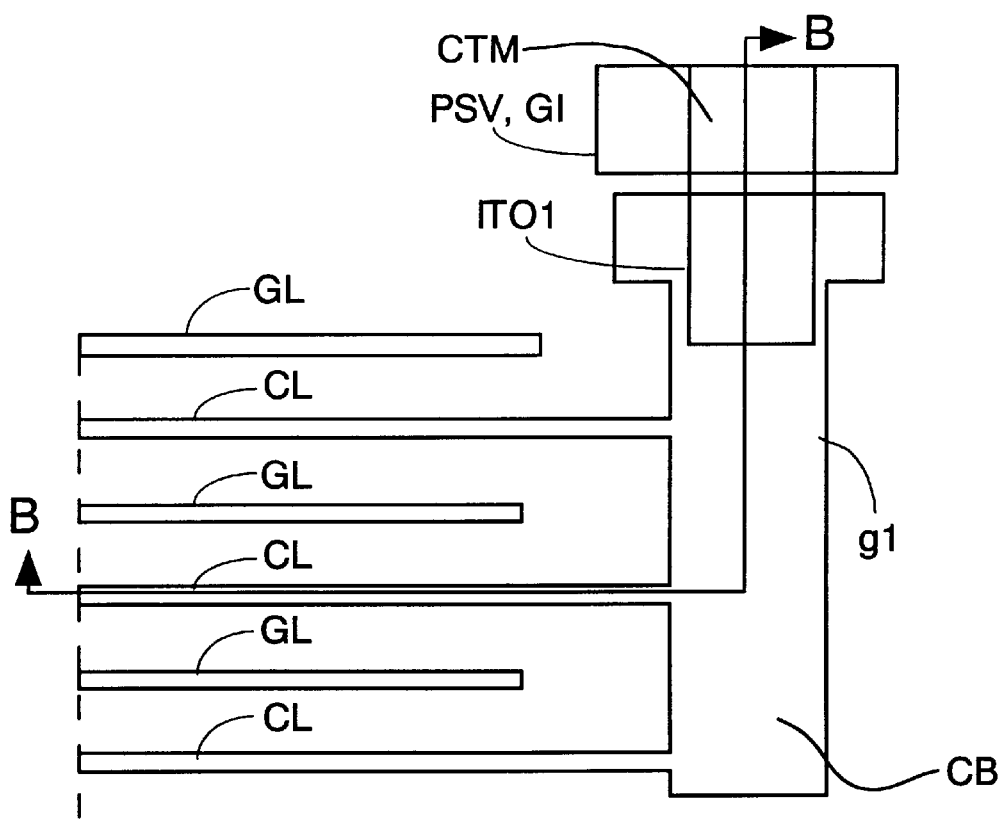
FIGS. 9(a) and 9(b) are views showing the construction of one embodiment of a counter voltage signal terminal of the liquid crystal display device according to the invention.
Figure 9B:
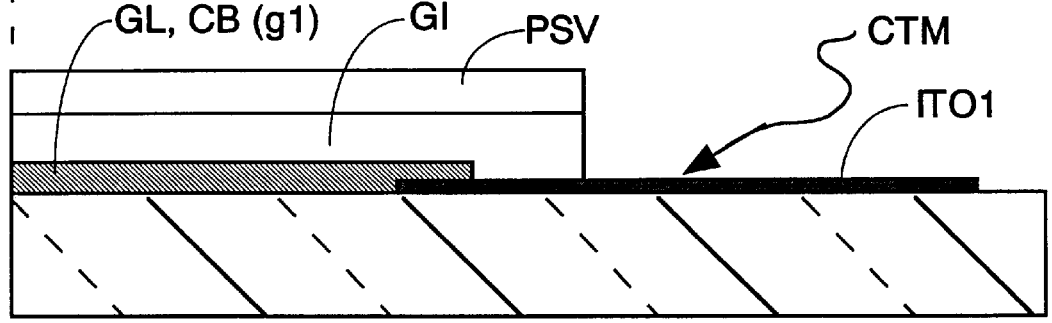

FIGS. 9(a) and 9(b) are views showing the construction of a counter voltage signal terminal CTM through to supply counter voltage signals to the counter voltage signal lines CL. FIG. 9(a) is a plan view, and FIG. 9(b) is a cross-sectional view taken along line B—B of FIG. 9(a).

Referring to FIGS. 9(a) and 9(b), the counter voltage signal terminal CTM formed on the transparent substrate SUB1 is also made of the ITO film ITO1 which has reliability against electrolytic corrosion. This ITO film ITO1 is formed at the same time as the counter electrodes CT.

The counter voltage signal line CL is formed to cover the end of the counter voltage signal terminal CTM that is located on the side of the counter voltage signal line CL.

The insulating film GI and the protective film PSV which is formed as extended portions of those formed in the display area AR are stacked in that order to cover the counter voltage signal terminal CTM and the counter voltage signal line CL, and part of the counter voltage signal terminal CTM is exposed in an opening formed in the protective film PSV and the insulating film GI.

<<Equivalent Circuit>>

Figure 10:
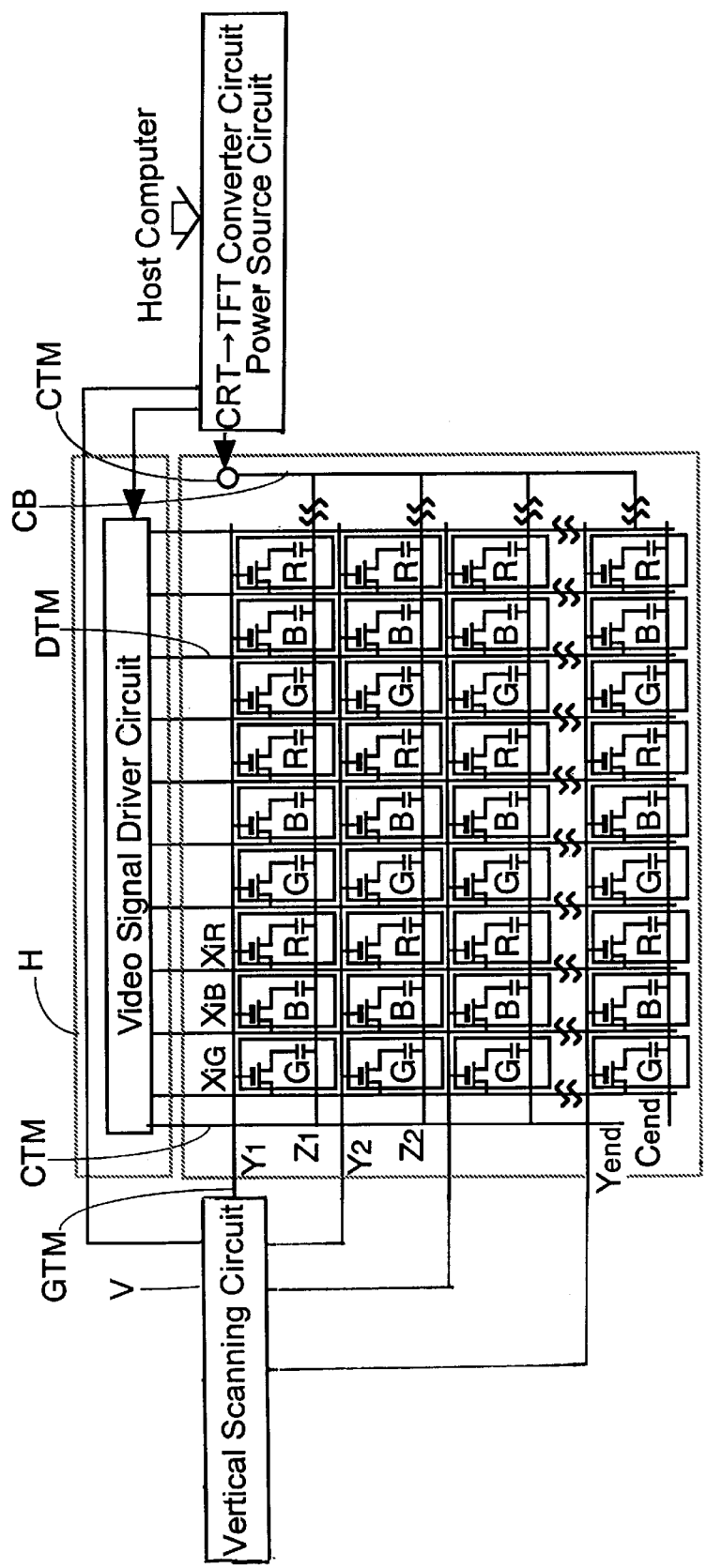
FIG. 10 is an equivalent circuit diagram showing one embodiment of the liquid crystal display device according to the invention.

FIG. 10 is a view showing the equivalent circuit of the liquid crystal panel as well as the external circuits of the liquid crystal panel.

Scanning signals (voltage signals) are sequentially supplied to the individual gate signal lines GL disposed to be extended in a horizontal (x) direction of FIG. 10 and to be juxtaposed in a vertical (y) direction of FIG. 10, by a vertical scanning circuit V.

The thin film transistors TFT in the respective pixel areas arranged along the one of the gate signal lines GL to which a scanning signal is supplied are turned on by the scanning signal.

At this timing, video signals are supplied to the individual drain signal lines DL from a video signal driver circuit H, and these video signals are applied to the respective pixel electrodes via the thin film transistors of the corresponding pixel areas.

In the respective pixel areas, counter voltages are applied to the counter electrodes CT formed together with the pixel electrodes via the counter voltage signal lines CL, so that electric fields can be generated between the pixel electrodes and the counter electrodes CT.

The optical transmissivity of the liquid crystal is controlled by the ones (lateral electric fields) of these electric fields each of which has a component parallel to the transparent substrates.

Incidentally, in FIG. 10, the symbols R, G and B shown in the individual pixel areas represent that a red filter, a green filter and a blue filter are formed in the respective pixel areas.

<<Timing Chart of Pixel Display>>

Figure 11:
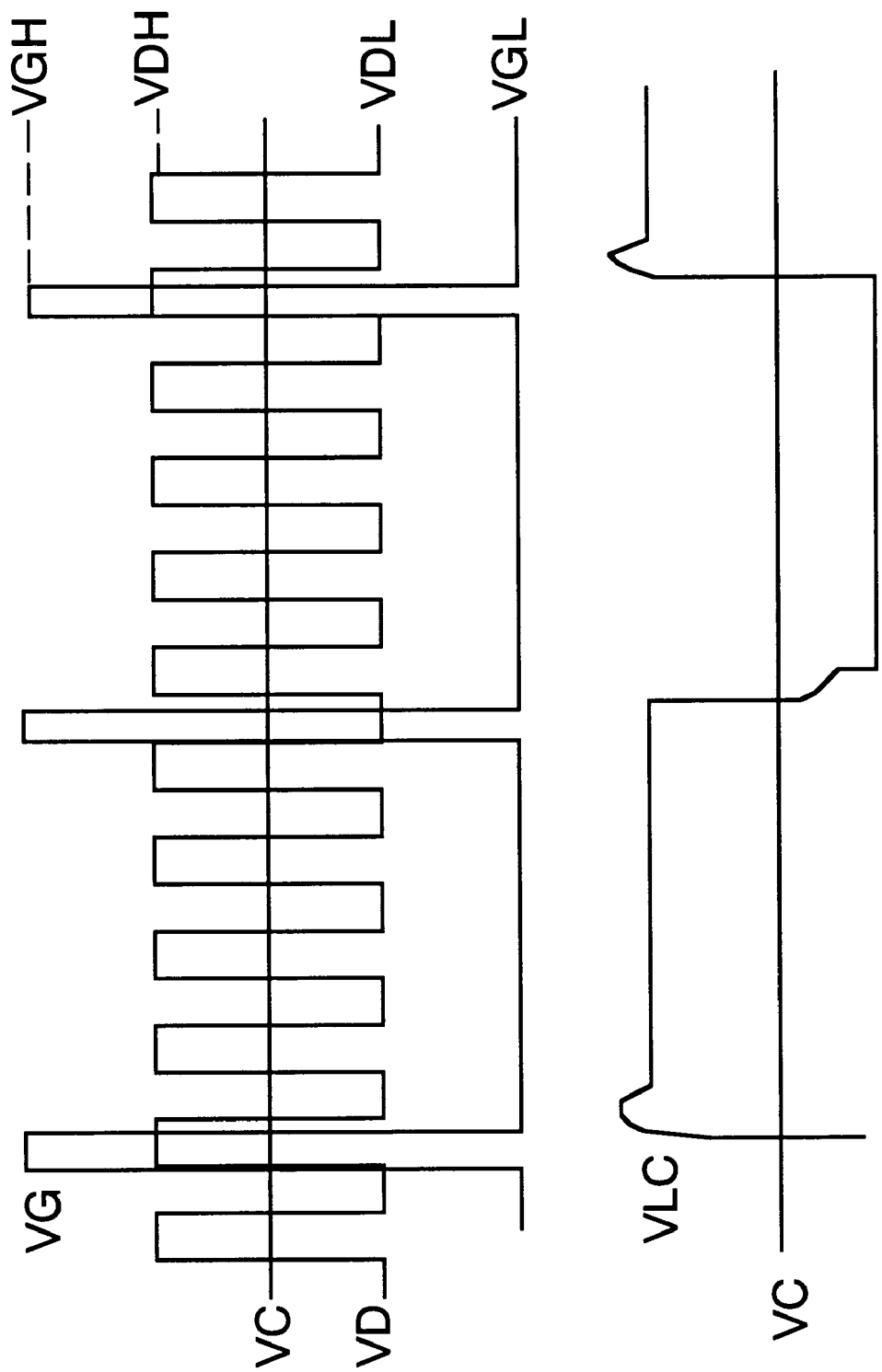
FIG. 11 is a timing chart showing one embodiment of the driving of the liquid crystal display device according to the invention.

FIG. 11 shows the timing charts of the respective signals to be supplied to the liquid crystal panel. In FIG. 11, VG denotes a scanning signal to be supplied to the gate signal lines GL, VD denotes a video signal to be supplied to the drain signal lines DL, and VC denotes a counter voltage signal to be supplied to the counter electrodes CT.

FIG. 11 is a driving waveform diagram showing general line inversion (dot inversion) with the potential of the counter voltage signal VC kept constant.

<<Liquid Crystal Display Panel Module>>

Figure 12:
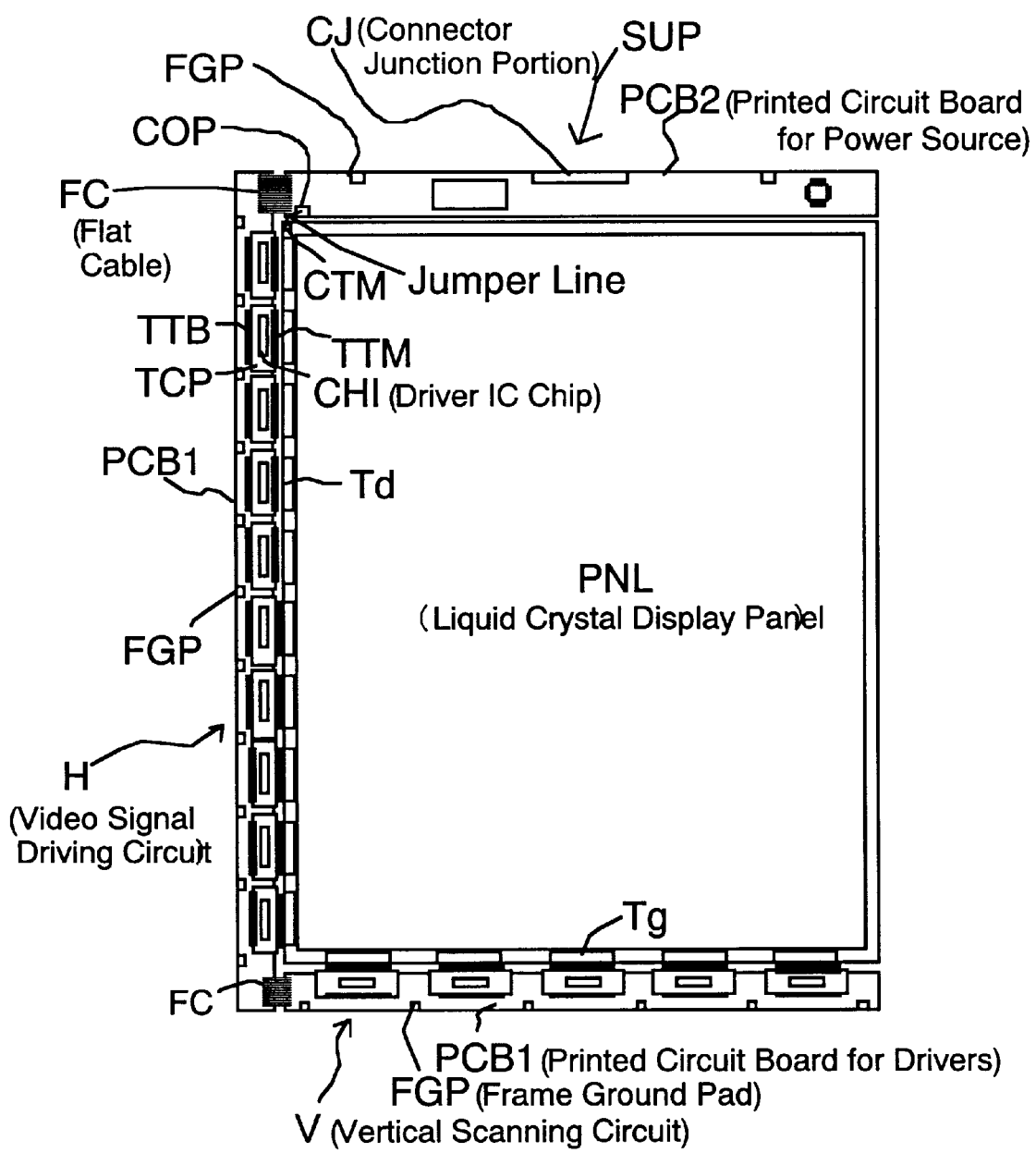
FIG. 12 is a plan view showing the case external circuits are connected to the liquid crystal display panel of the liquid crystal display device according to the invention.

FIG. 12 is a plan view showing a module structure in which external circuits are mounted on the liquid crystal panel shown in FIG. 5.

Referring to FIG. 12, the vertical scanning circuit V, the video signal driver circuit H and a power source circuit board PCB2 are connected to the periphery of a liquid crystal panel PNL.

The vertical scanning circuit V is made of plural driver IC chips formed by a film carrier method, and the output bumps of the driver IC chips are connected to the gate signal terminals GTM of the liquid crystal panel PNL, while the input bumps of the driver IC chips are connected to the terminals of a flexible printed circuit board.

The video signal driver circuit H is similarly made of plural driver IC chips formed by a film carrier method, and the output bumps of the driver IC chips are connected to drain signal terminals DGTM of the liquid crystal panel PNL, while the input bumps of the driver IC chips are connected to the terminals of a flexible printed circuit board.

The power source circuit board PCB2 is connected to the video signal driver circuit H via a flat cable FC, and the video signal driver circuit H is connected to the vertical scanning circuit V via the flat cable FC.

Incidentally, the present invention is not limited to the above-described type of construction, and can, of course, be applied to a so-called COG (Chip On Glassy scheme in which semiconductor chips which constitute individual circuits are directly mounted on the transparent substrate SUB1 and the input and output bumps of the respective semiconductor chips are connected to terminals (or interconnection layers) formed on the transparent substrate SUB1.

<<Manufacturing Method>>

FIGS. 13(A) to 13(C) and 14(D) to 14(F) are a process diagram showing one example of a method of manufacturing the above-described TFT substrate.

Figure 13:
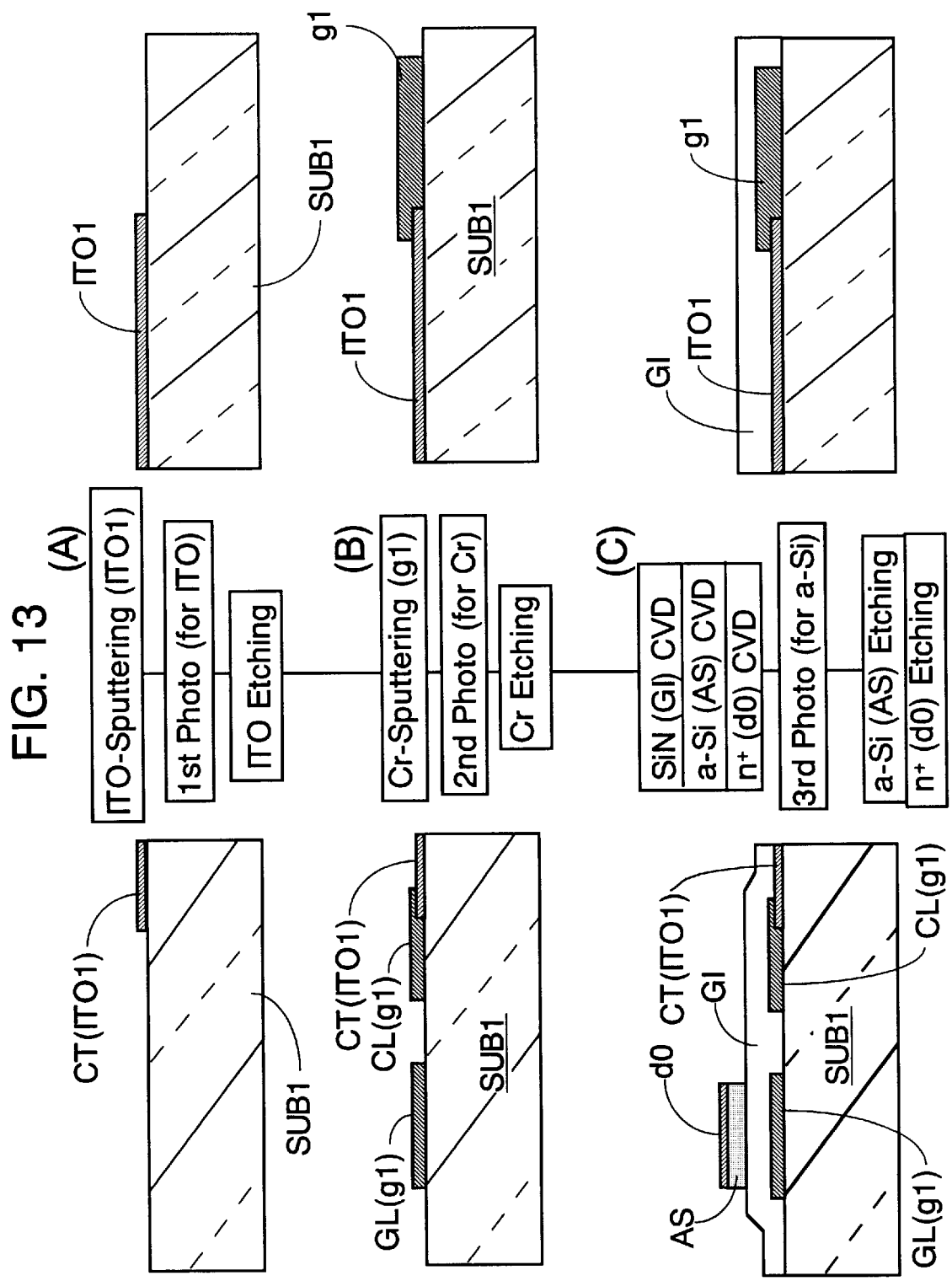
FIGS. 13(a) to 13(c) are a process diagram showing one example of a method of manufacturing the liquid crystal display device according to the present invention, and are views combined with FIGS. 14(d) to 14(f)

The TFT substrate is manufactured through a photolithographic process which includes the steps shown in FIGS. 13(A) and 13(B). The left side of each of FIGS. 13(A) and 13(B) shows a pixel area, while the right side of each of FIGS. 13(A) and 13(B) shows a drain signal terminal formation area.

The manufacturing method will be described below in the order of the photolithographic process.

Step (A) Shown in FIG. 13(A)

The transparent substrate SUB1 is prepared, and an ITO film is formed over the entire surface of the transparent substrate SUB1, as by sputtering. Then, a photolithographic technique is used to selectively etch the ITO film, whereby the counter electrodes CT are formed in the pixel area, while the drain signal terminals DTM are formed in the drain signal terminal formation area.

Step (B) Shown in FIG. 13(B)

A Cr film is formed over the entire surface of the transparent substrate SUB1. Then, a photolithographic technique is used to selectively etch the Cr film, whereby the gate signal lines GL and the counter voltage signal lines CL are formed in the pixel area, while the metal layers g1 which serve as intermediate connectors are formed in the drain signal terminal formation area.

Step (C) Shown in FIG. 13(C)

A SiN film is formed over the entire surface of the transparent substrate SUB1, as by a CVD method, thereby forming the insulating film GI.

Furthermore, an a-Si layer and an a-Si layer doped with an n type impurity are formed in that order over the entire surface of the insulating film GI, as by a CVD method.

Then, a photolithographic technique is used to selectively etch the a-Si layer, thereby forming the semiconductor layers AS for the thin film transistors TFT in the pixel area.

Figure 14:
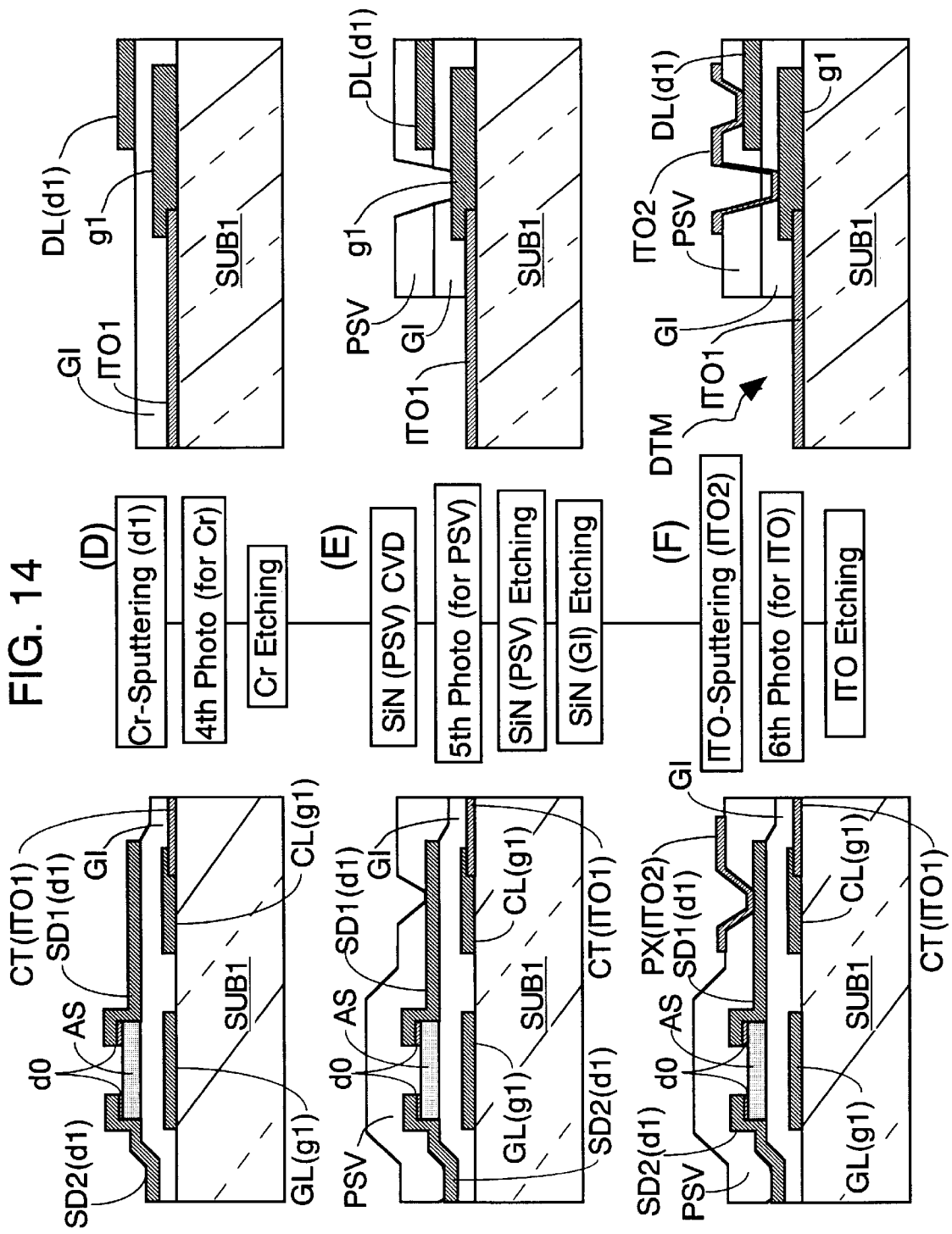
FIGS. 14(d) to 14(f) are a process diagram showing one example of the method of manufacturing the liquid crystal display device according to the invention, and are views combined with FIGS. 13(a) to 13(c)

Step (D) Shown in FIG. 14(D)

A Cr film is formed over the entire surface of the transparent substrate SUB1, as by a sputtering method, and a photolithographic technique is used to selectively etch the Cr film, whereby the drain signal lines DL and the source electrodes SD1 and the drain electrodes SD2 for the thin film transistors TFT are formed in the pixel area, while the extended portions of the drain signal lines DL are formed in the drain signal terminal formation area.

Step (E) Shown in FIG. 14(E),

A SiN film is formed over the entire surface of the transparent substrate SUB1, as by a CVD method, thereby forming the protective film PSV. Then, a photolithographic technique is used to selectively etch the protective film PSV whereby contact holes each of which exposes part of the corresponding one of the drain electrodes SD2 of the thin film transistors TFT are formed in the pixel area, while contact holes in each of which part of the corresponding one of the metal layers g1 is exposed are formed to be extended to the insulating film GI underlying the protective film PSV in the drain signal terminal formation area.

Step (F) Shown in FIG. 14(F)

The ITO film ITO2 is formed over the entire surface of the transparent substrate SUB1, as by a sputtering method. Then, a photolithographic technique is used to selectively etch the protective film PSV whereby the pixel electrodes PX connected to the corresponding drain electrodes SD2 of the thin film transistors TFT through the respective contact holes as well as the floating conductive layers FCT are formed in the pixel area, while a conductor layer which provides connection between the drain signal lines DL and the metal layers g1 is formed in the drain signal terminal formation area.

<Embodiment 2>

<<Construction of Pixel>>

Figure 15:
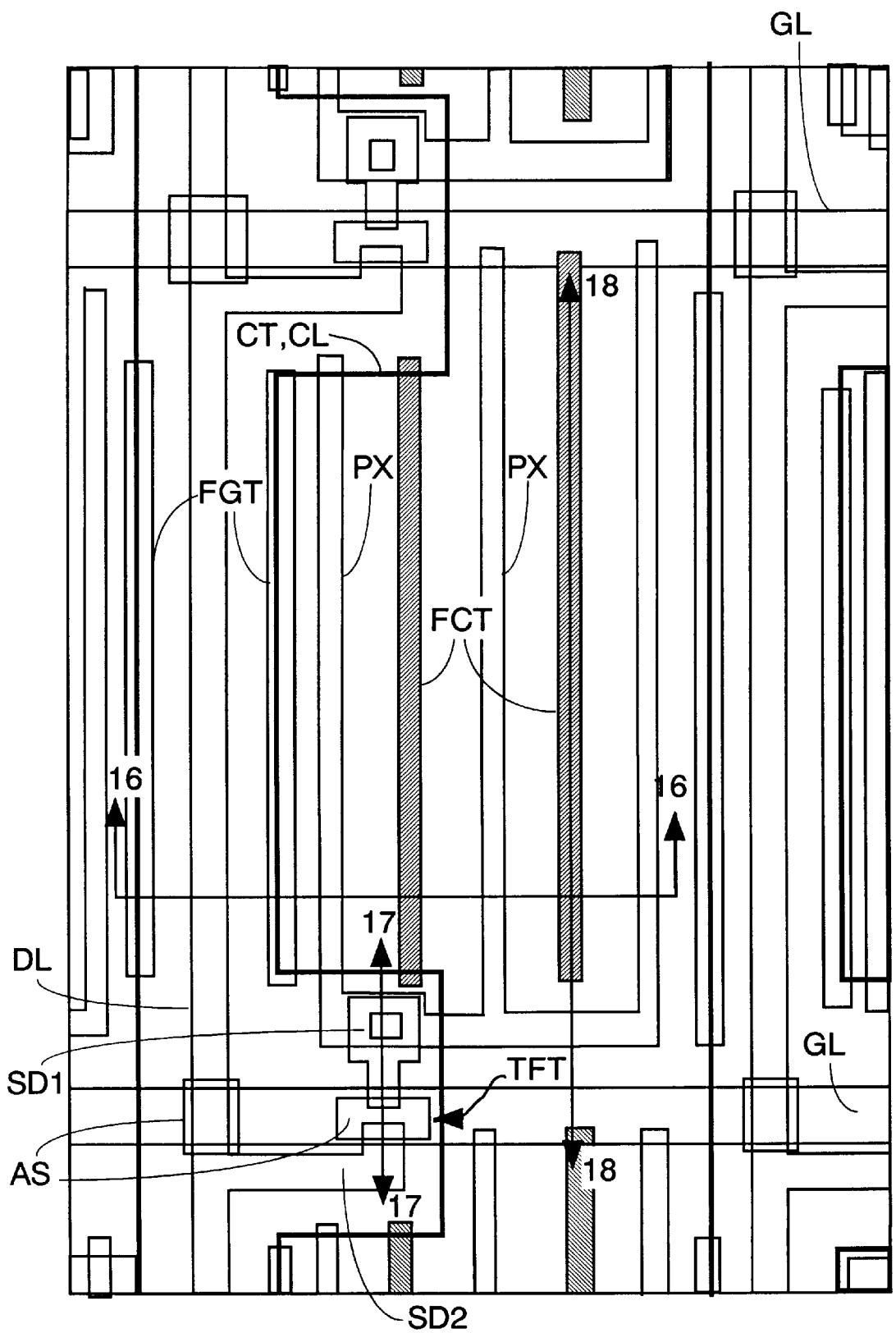
FIG. 15 is a plan view showing another embodiment of the pixel area of the liquid crystal display device according to the invention.
Figure 16:
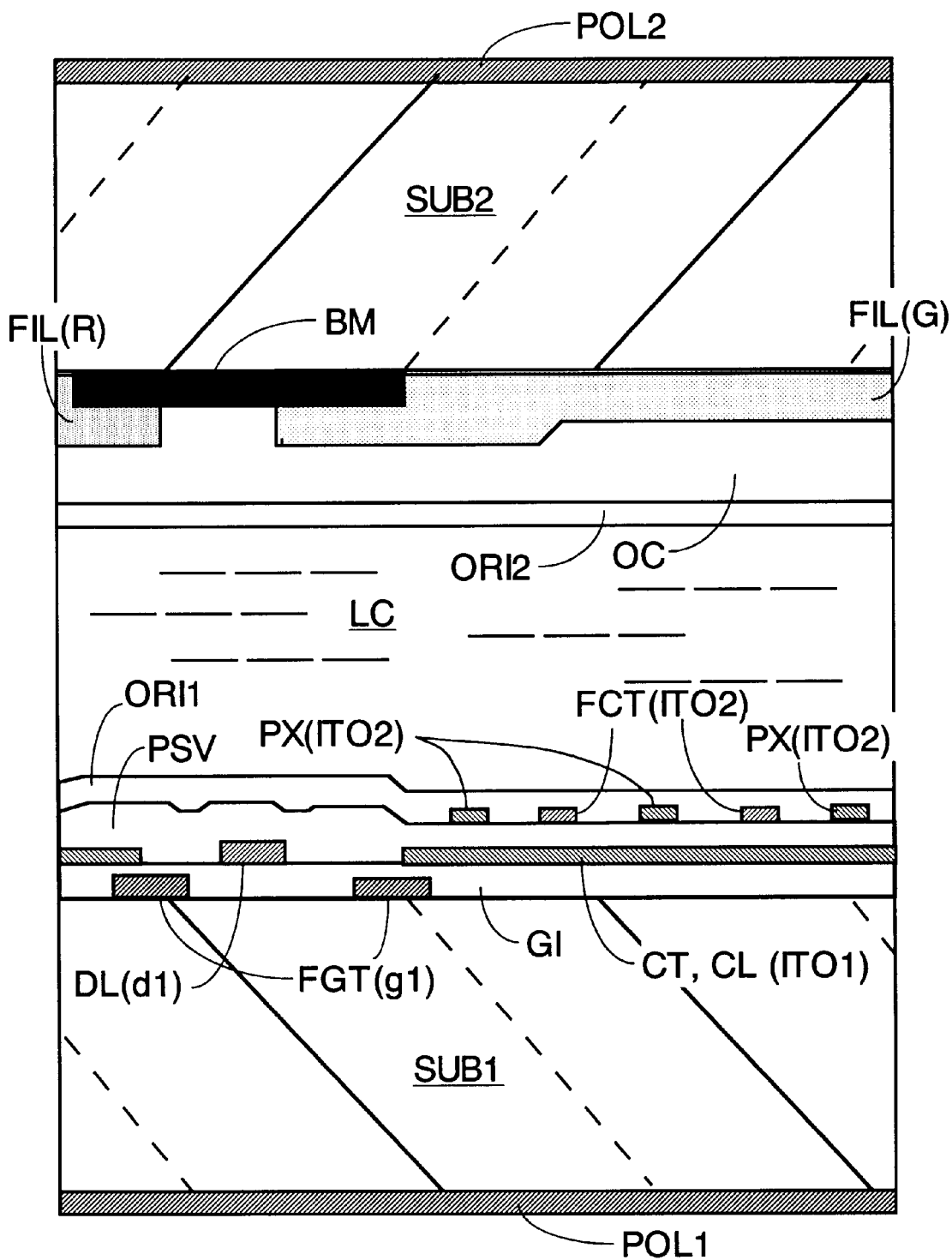
FIG. 16 is a cross-sectional view taken along line 16—16 of FIG. 15.
Figure 17:
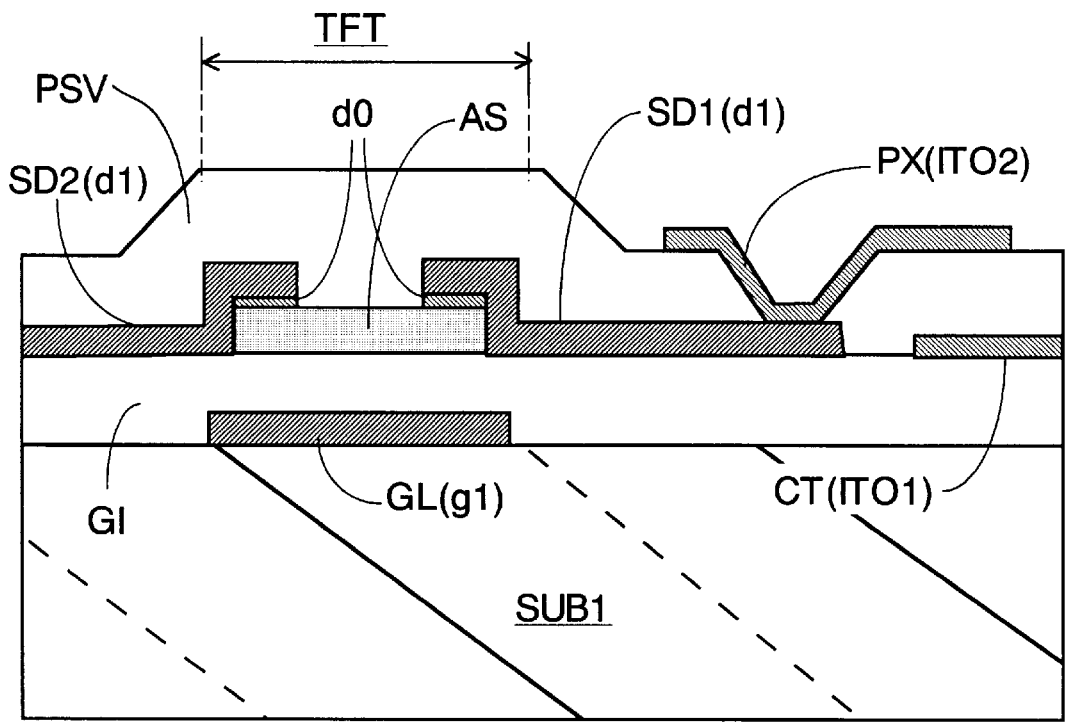
FIG. 17 is a cross-sectional view taken along line 17—17 of FIG. 15.
Figure 18:
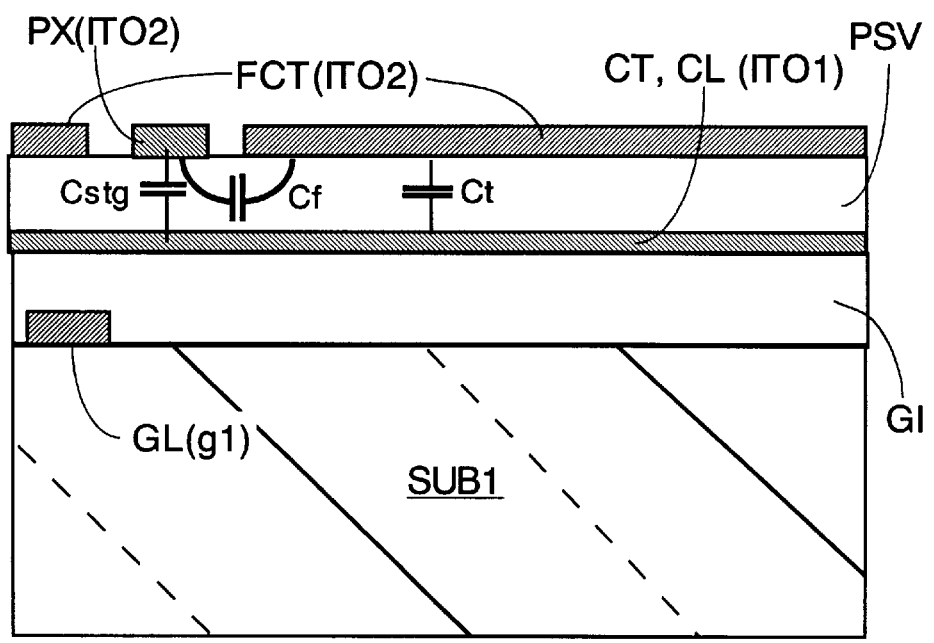
FIG. 18 is a cross-sectional view taken along line 18—18 of FIG. 15.
Figure 19:
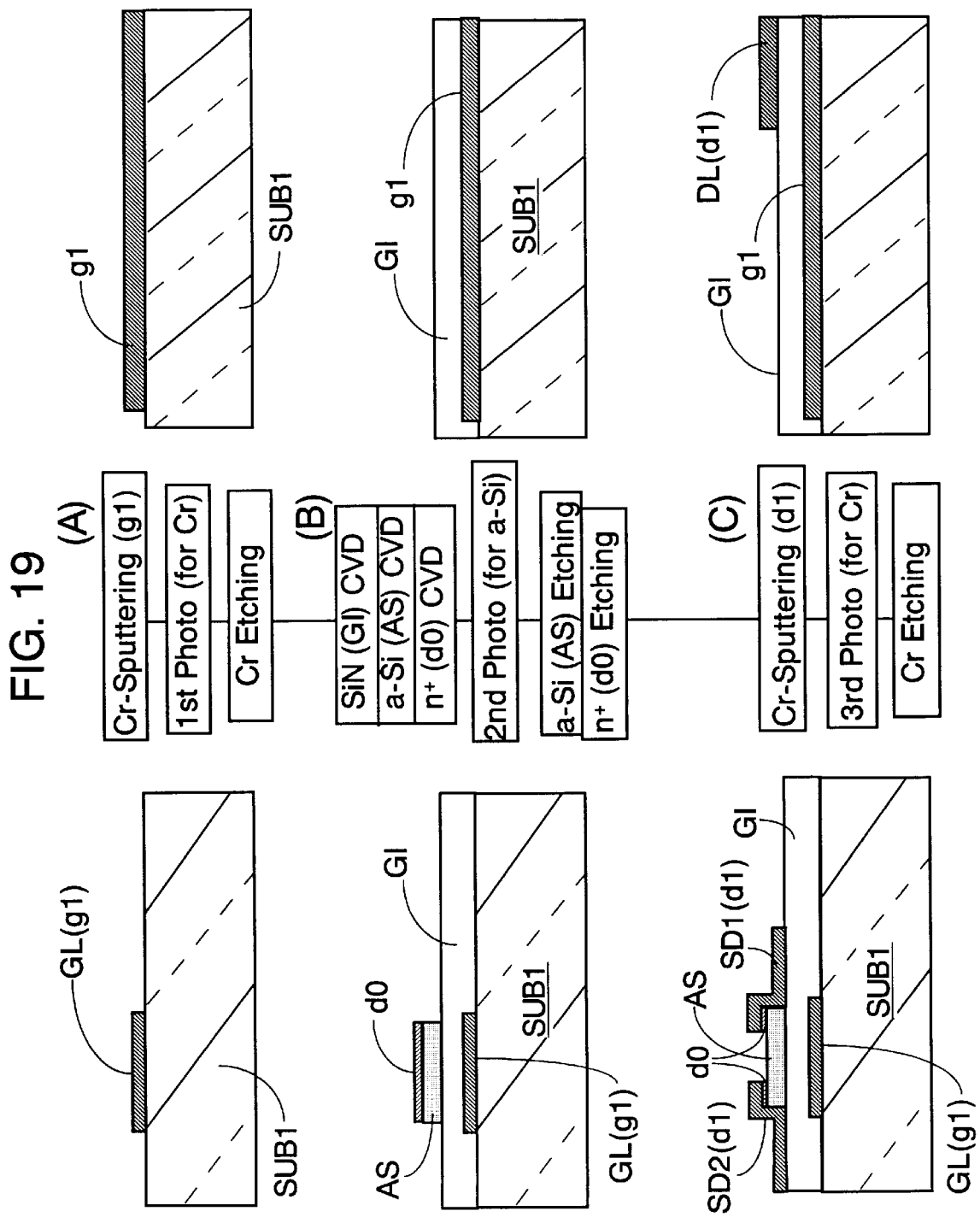
FIGS. 19(a) to 19(c) are a process diagram showing another example of the method of manufacturing the liquid crystal display device according to the invention, and are views combined with FIGS. 20(d) to 20(f)
Figure 20:
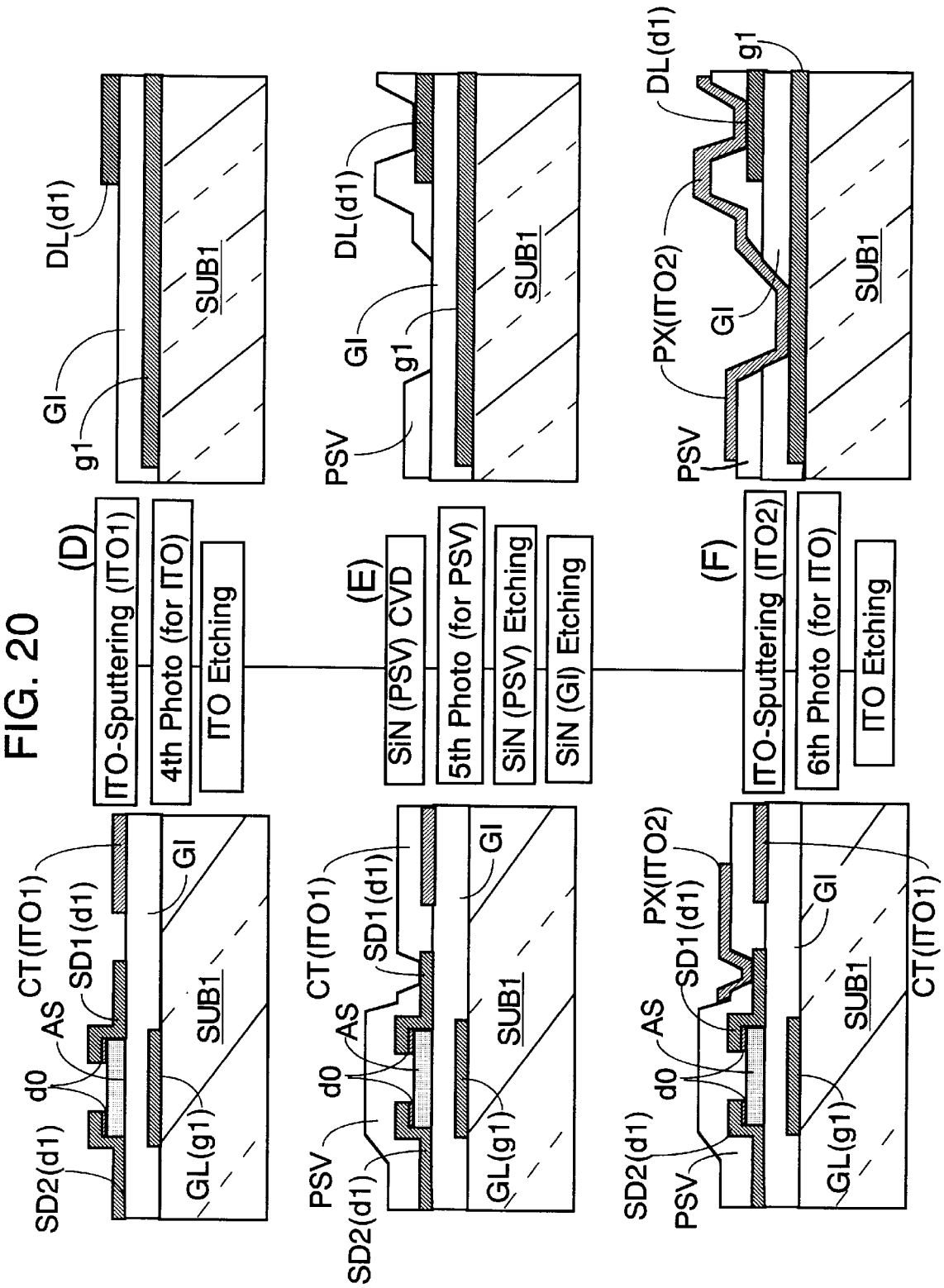
FIGS. 20(d) to 20(f) are a process diagram showing another example of the method of manufacturing the liquid crystal display device according to the invention, and are views combined with FIGS. 19(a) to 19(c)

FIG. 15 is a plan view showing another embodiment of the liquid crystal display device according to the present invention. FIG. 16 is a cross-sectional view taken along line 16—16 of FIG. 15, FIG. 17 is a cross-sectional view taken along line 17—17 of FIG. 15, and FIG. 17 is a cross-sectional view taken along line 18—18 of FIG. 15.

FIGS. 15, 16, 17 and 18 correspond to the respective drawings (FIGS. 1, 2, 3 and 4) Which show Embodiment 1, and the same symbols as those used in FIGS. 1, 2, 3 and 4 denote the same materials as those used in Embodiment 1.

First of all, the construction of Embodiment 2 differs from that of Embodiment 1 in that the counter electrodes CT each made from a transparent electrode are formed over the insulating film GI as the same layer as the drain signal lines DL.

This fact means that the counter electrodes CT are formed as a layer different from the gate signal lines GL.

Conductive films FGT are provided on the side portions of the respective counter electrodes CT that are close to the adjacent drain signal lines DL. The conductive films FGT are provided in the same layer as the gate signal lines GL, and are formed in the state of being not connected to the counter electrodes CT.

For this reason, the conductive films FGT do not function as part of the counter voltage signal lines CL like Embodiment 1, and exclusively function as a light blocking material for blocking light leaking from the liquid crystal due to electric fields which occur as noise between the drain signal lines DL and the counter electrodes CT.

In the case where the liquid crystal display device is constructed in this manner, the liquid crystal display device has the advantage that the gap between the drain signal lines DL and the counter electrodes CT can be made narrow and the aperture ratio can be increased.

However, it goes without saying that the conductive films FGT need not be formed in this manner, and may be formed in the same layer as the counter electrodes CT and may also be formed to be partly connected to the side portions of the respective counter electrodes CT that are close to the adjacent drain signal lines DL.

The counter electrodes CT of the respective pixel areas arranged along each of the drain signal lines DL (in a direction perpendicular to the gate signal lines GL) are connected to one another.

Specifically, the counter electrodes CT of the respective pixel areas are integrally formed to pass over areas in which the respective gate signal lines GL are formed.

In other words, the counter electrodes CT of the respective pixel areas arranged along each of the drain signal lines DL are formed in the shape of a strip along the drain signal line DL.

These counter electrodes CT are formed in a layer different from the gate signal lines GL, and can be formed without being connected to the gate signal lines GL.

If a construction is adopted in which the counter electrodes CT formed in this strip-like shape are supplied with counter voltage signals from the outside of the display area formed as an assembly of the pixel areas, it is possible to provide the advantage that it is not necessary to form the counter voltage signal lines CL used in Embodiment 1.

Incidentally, in the above-described Embodiment 2, the counter electrodes CT of the respective pixel areas arranged along each of the drain signal lines DL are constructed in common. However, it goes without saying that the counter electrodes CT of the respective pixel areas arranged along each of the gate signal lines GL may be constructed in common.

In this case, the counter electrodes CT need to be formed in a layer different from the drain signal lines DL. This construction can be applied to Embodiment 1.

Incidentally, in Embodiment 2, the pixel electrodes PX and the floating conductive layers FCT are made closer to the gate signal line GL or are formed to be extended into the state of being superposed on the gate signal line GL (refer to FIG. 15), whereby it is possible to increase the function of the pixel area even in the vicinity of the gate signal line GL.

This fact means that it is sufficient to give the gate signal lines GL themselves the function of a black matrix (in other words, there is no need for a black matrix to cover each of the gate signal lines GL and the vicinity thereof) and it is, therefore, possible to achieve the advantage of greatly improving the aperture ratio.

<<Manufacturing Method>>

FIGS. 19(A) to 19(C) and 20(D) to 20(F) are a process diagram showing one example of a method of manufacturing the above-described liquid crystal display device of Embodiment 2, and correspond to FIGS. 13(A) to 13(C) and 14(D) to 14(F).

As compared with Embodiment 1, Embodiment 2 has a different construction in which the counter electrode CT is formed on the upper surface of the insulating film GI, and the pixel electrode PX is formed over the counter electrode CT with the protective film PSV interposed therebetween. According to the difference in construction, Embodiment 2 differs in manufacturing process from Embodiment 1.

<Embodiment 3>

Figure 21:
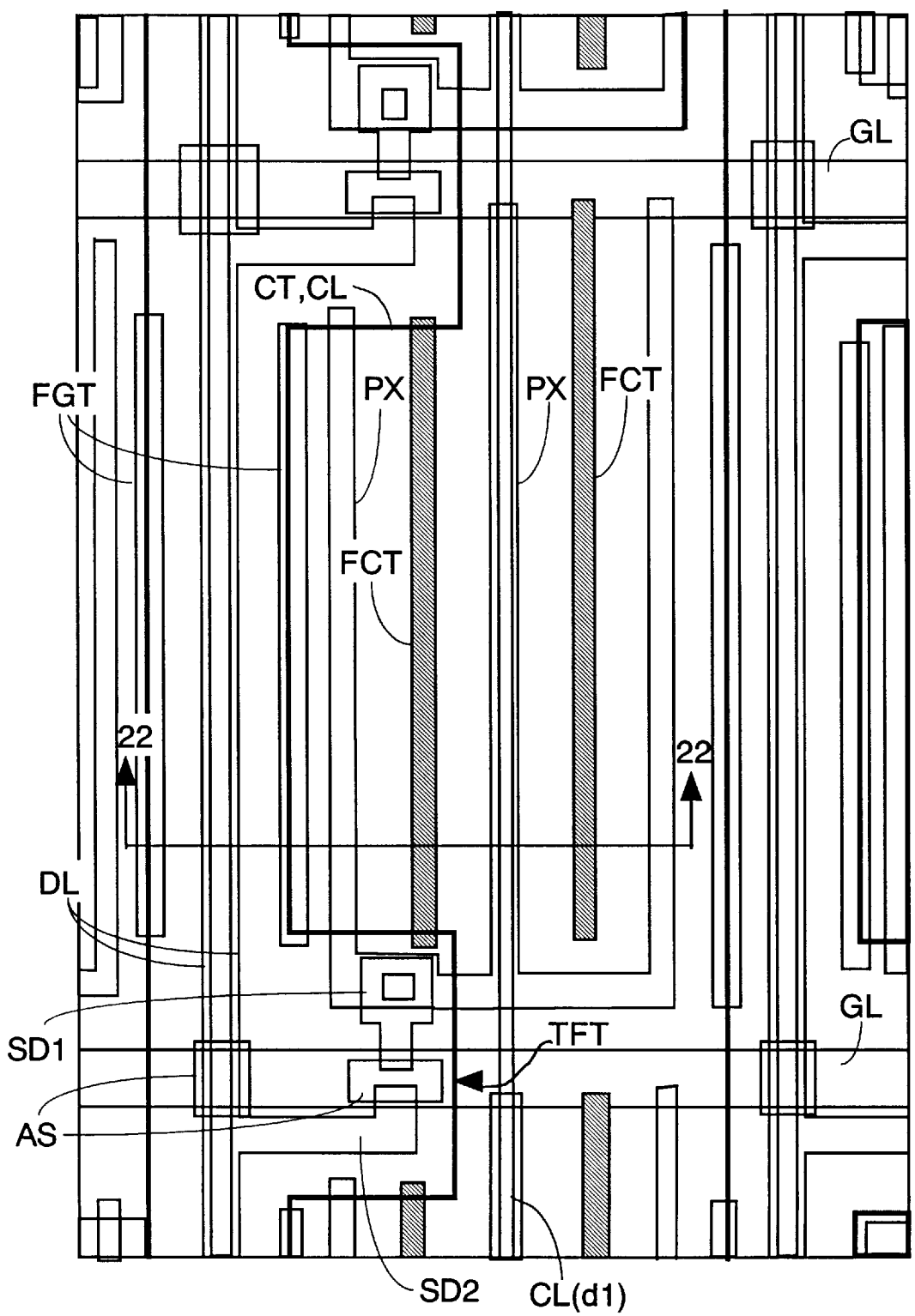
FIG. 21 is a plan view showing another embodiment of the pixel area of the liquid crystal display device according to the invention.
Figure 22:
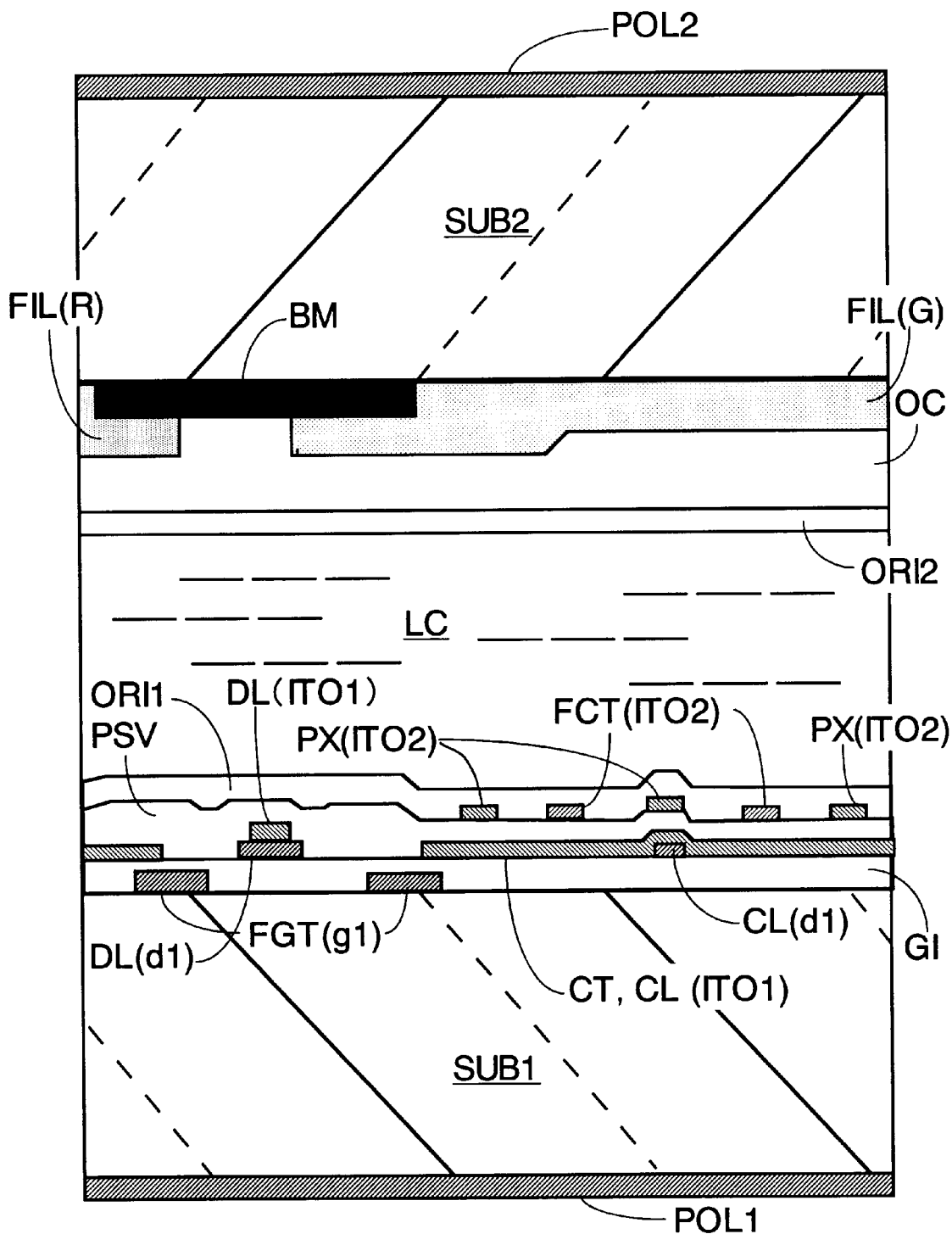
FIG. 22 is a cross-sectional view taken along line 22—22 of FIG. 21.

FIG. 21 is a plan view corresponding to FIG. 15, and shows another embodiment of the liquid crystal display device according to the present invention. FIG. 22 is a cross-sectional view taken along line 22—22 of FIG. 21.

In FIGS. 21 and 22, the same symbols as those shown in FIG. 15 denote the same materials as those shown in FIG. 15. First of all, the construction of Embodiment 3 differs from that shown in FIG. 15 in that the counter voltage signal line CL is formed to run nearly parallel to the drain signal line DL in the pixel areas arranged along the drain signal line DL.

This counter voltage signal line CL is formed immediately below (or immediately above) the counter electrode CT, i.e., in the state of being connected to the counter electrode CT. Therefore, the counter voltage signal line CL has the function of reducing the electrical resistance of the counter electrode CT itself.

The counter voltage signal line CL is formed at the same time as, for example, the drain signal line DL, and is made of the same material as the drain signal line DL. Therefore, the counter voltage signal line CL is formed of a conductive layer having a smaller electrical resistance than ITO which constitutes the counter electrode CT.

The counter voltage signal line CL is disposed to run through the center of the pixel area in such a manner as to divide the pixel area into two equal parts. The reason for this is that the counter voltage signal line CL can be formed to be reliably prevented from being short-circuited to the drain signal lines DL present on both sides of the pixel area.

Moreover, the counter voltage signal line CL is formed to be superposed on one of the pixel electrodes PX formed to be extended in the y direction of FIG. 21.

Since the optical transmissivity of the portion in which the pixel electrodes PX are formed is reduced by the pixel electrodes PX as well as the counter electrode CT, the counter voltage signal line CL is positioned in this portion for the purpose of minimizing a reduction in optical transmissivity.

In Embodiment 3, the ITO film ITO1 is formed in the state of being stacked on the upper surface of the drain signal line DL, whereby even if the drain signal line DL is formed in a disconnected state, the disconnection can be repaired with the ITO film ITO1.

Since this ITO film ITO1 can be formed at the same time as the formation of the counter electrode CT, the ITO film ITO1 has the advantage of preventing an increase in the number of manufacturing steps.

<Embodiment 4>

Figure 23:
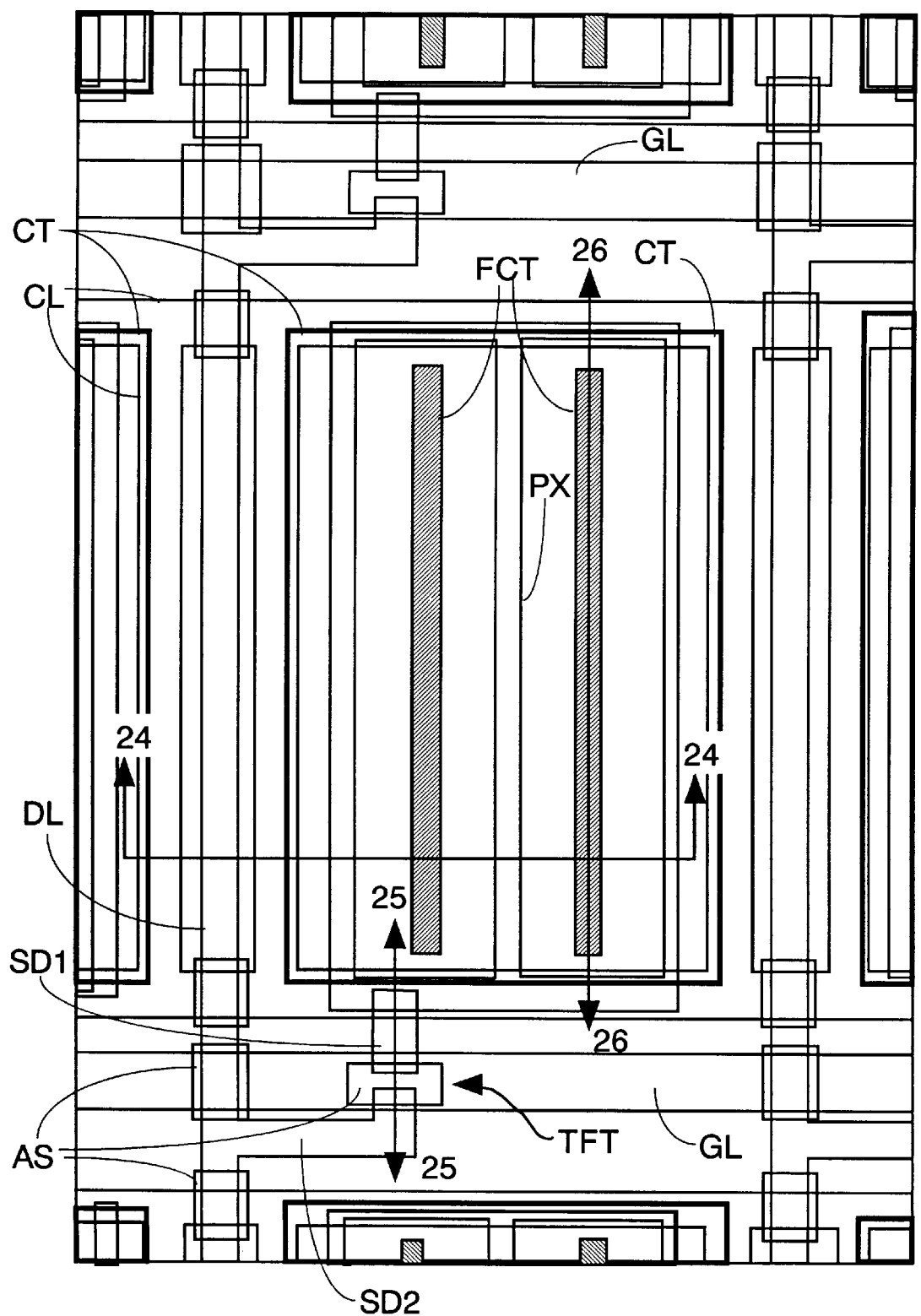
FIG. 23 is a plan view showing another embodiment of the pixel area of the liquid crystal display device according to the invention.
Figure 24:
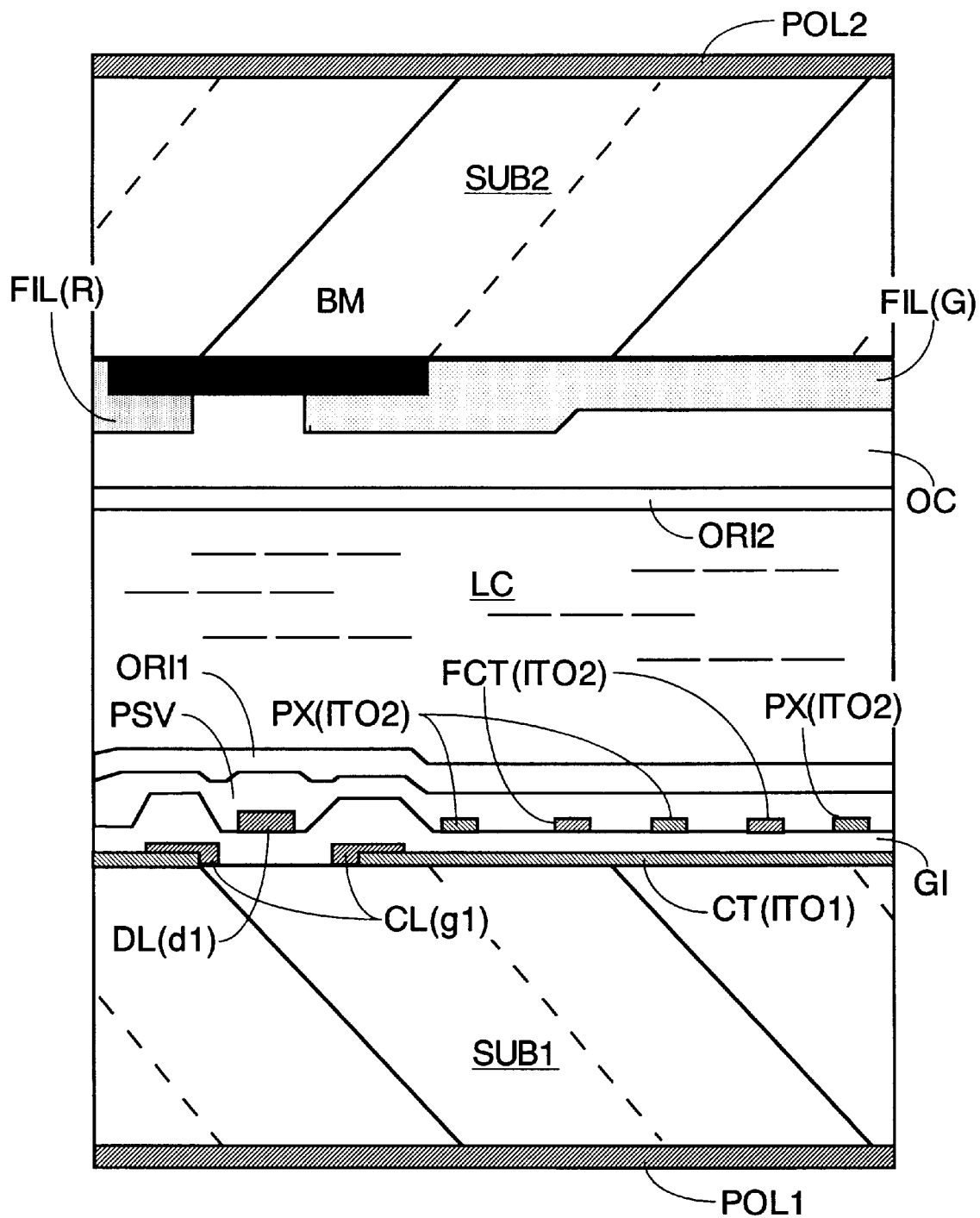
FIG. 24 is a cross-sectional view taken along line 24—24 of FIG. 23.
Figure 25:
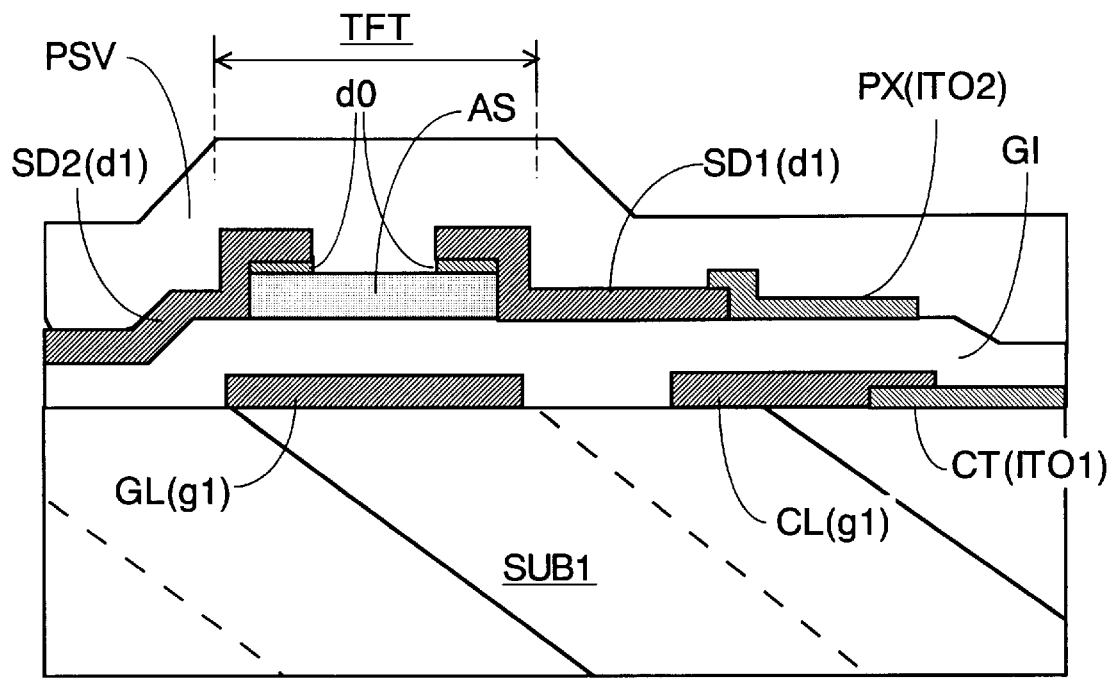
FIG. 25 is a cross-sectional view taken along line 25—25 of FIG. 23.
Figure 26:
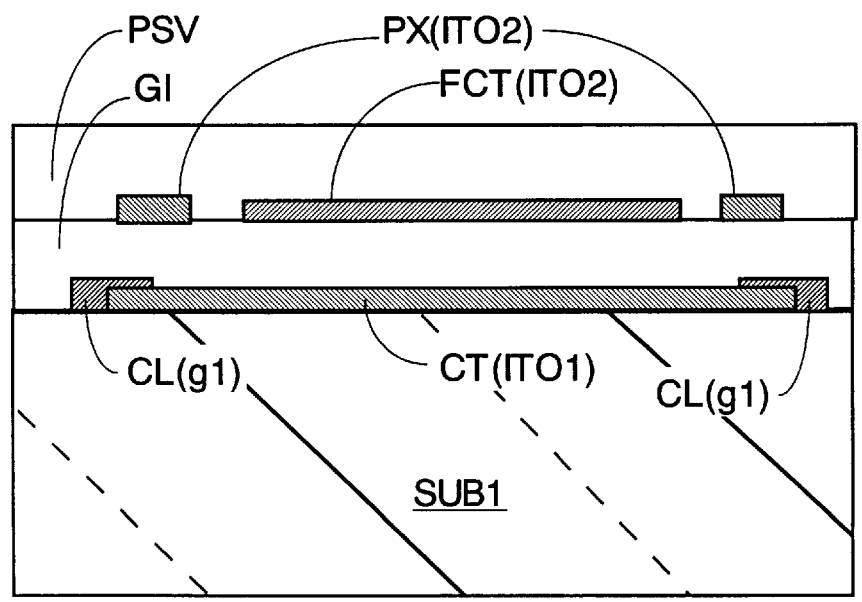
FIG. 26 is a cross-sectional view taken along line 26—26 of FIG. 23.

FIG. 23 is a plan view showing another embodiment of the liquid crystal display device according to the present invention. FIG. 24 is a cross-sectional view taken along line 24—24 of FIG. 23, FIG. 25 is a cross-sectional view taken along line 25—25 of FIG. 24, and FIG. 26 is a cross-sectional view taken along line 26—26 of FIG. 26.

FIG. 23 corresponds to FIG. 1, and the same symbols as those used in FIG. 1 denote the same materials as those used in Embodiment 1.

The construction of Embodiment 4 differs from that shown in FIG. 1 in that the pixel electrodes PX and the floating conductive layers FCT are formed on the insulating film 01, and the pixel electrodes PX and the floating conductive layers FCT are disposed to oppose the counter electrode CT with the insulating film GI interposed therebetween. That is to say, the pixel electrodes PX and the conductive layers FCT are disposed with the protective film PSV (and the alignment layer ORI1) interposed between a liquid crystal LC and the pixel electrodes PX as well as the conductive layers FCT.

In the case where the liquid crystal display device is constructed in this manner, since the lines of electric force applied to the liquid crystal LC are increased by the voltage dividing effect of the protective film PSV a low-resistance type of material can be selected for the material of the liquid crystal LC, so that it is possible to achieve the advantage of obtaining a display which is reduced in image retention.

In addition, in the case where the liquid crystal display device is constructed in this manner, since the connection between the source electrode SD1 of the thin film transistor TFT and the pixel electrodes PX can be directly effected as shown in FIG. 25, it is possible to omit the complicated process of effecting such connection through a contact hole formed in, for example, the protective film PSV.

<Embodiment 5>

Figure 27:
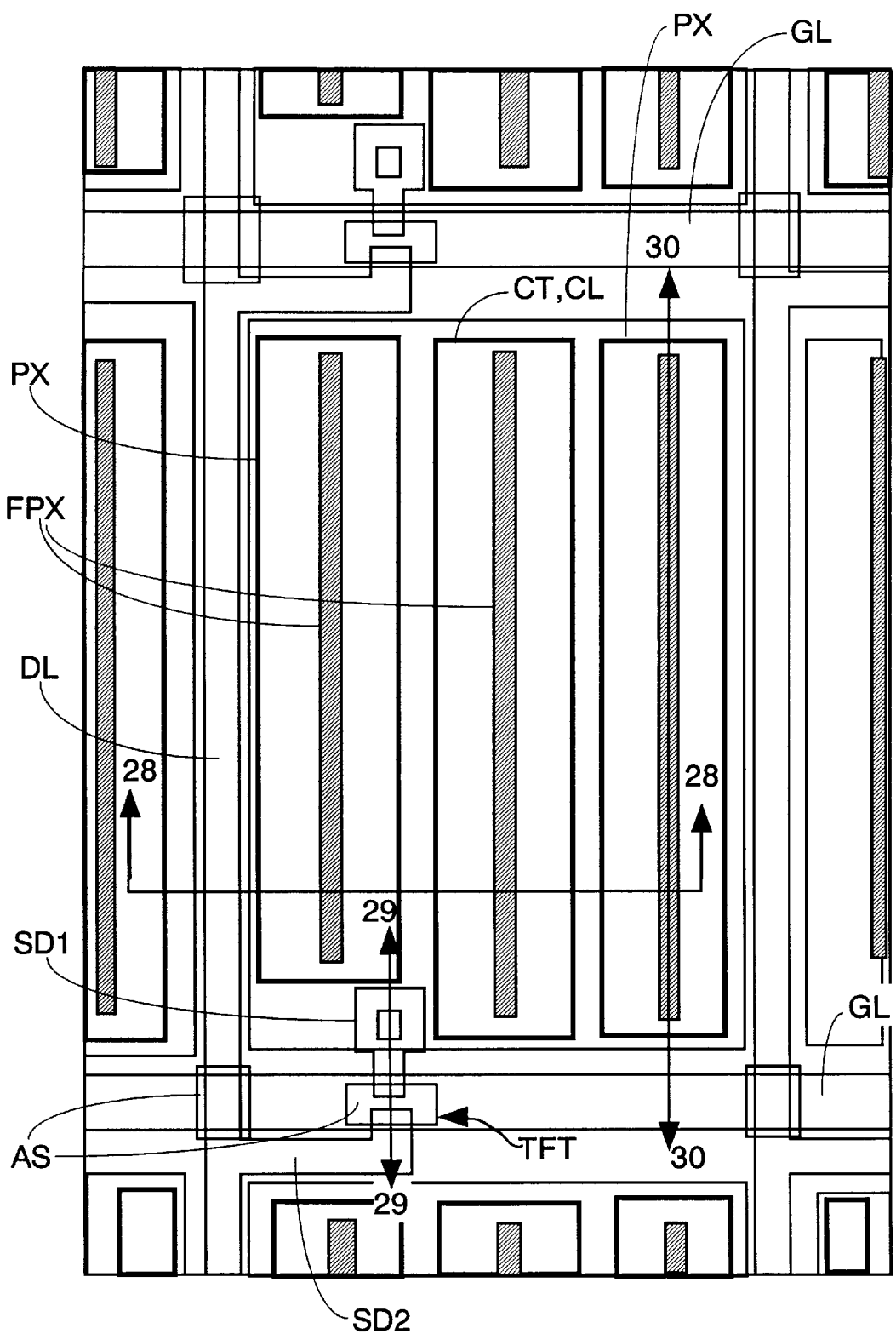
FIG. 27 is a plan view showing another embodiment of the pixel area of the liquid crystal display device according to the invention.
Figure 28:
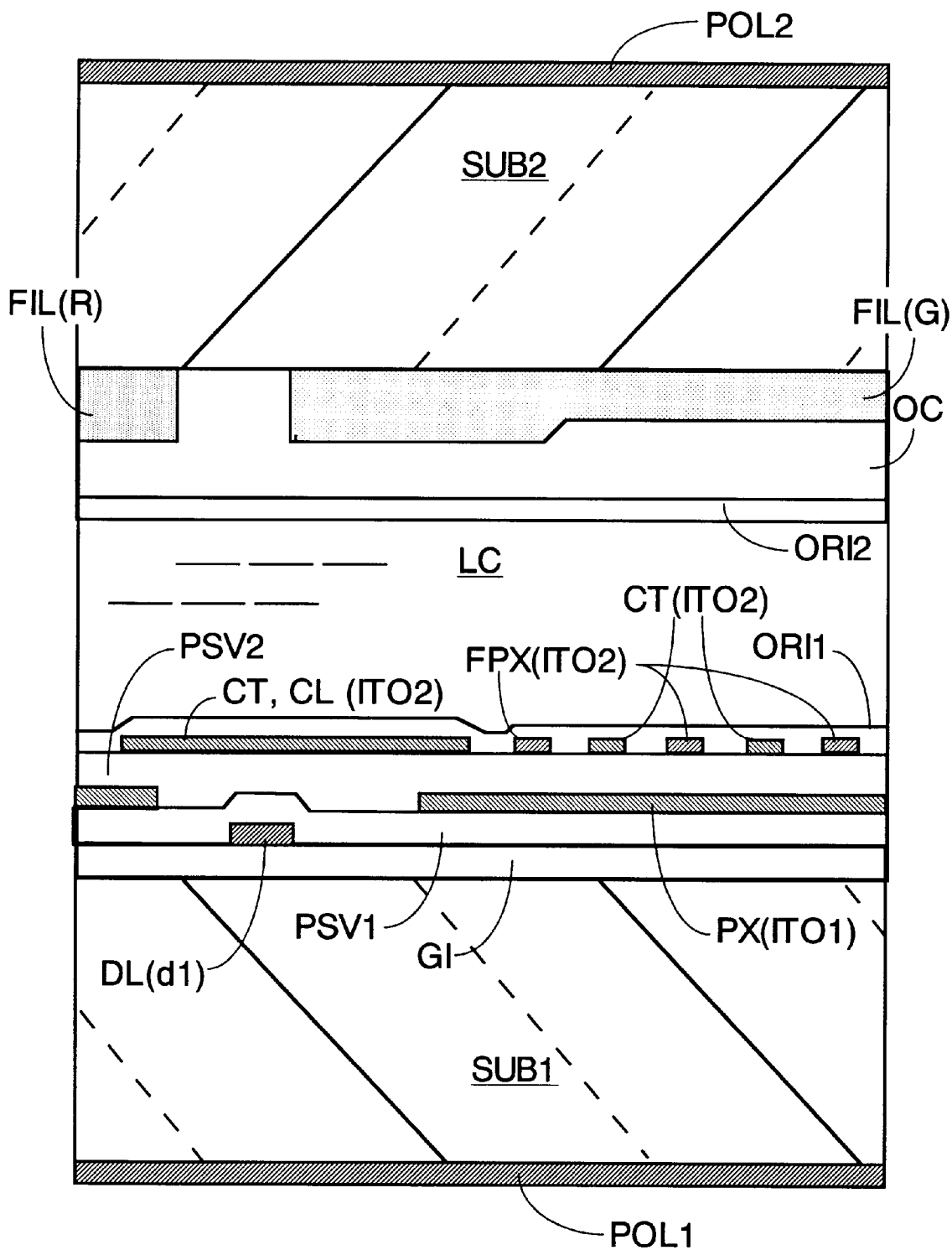
FIG. 28 is a cross-sectional view taken along line 28—28 of FIG. 27.
Figure 29:
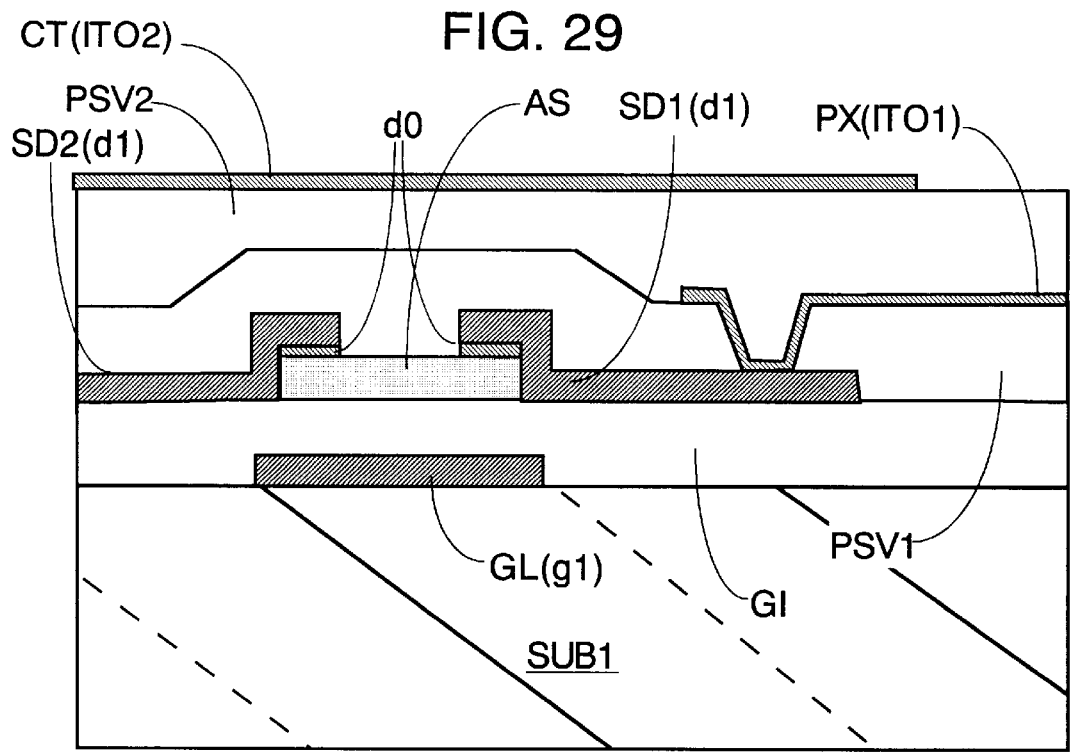
FIG. 29 is a cross-sectional view taken along line 29—29 of FIG. 27.
Figure 30:
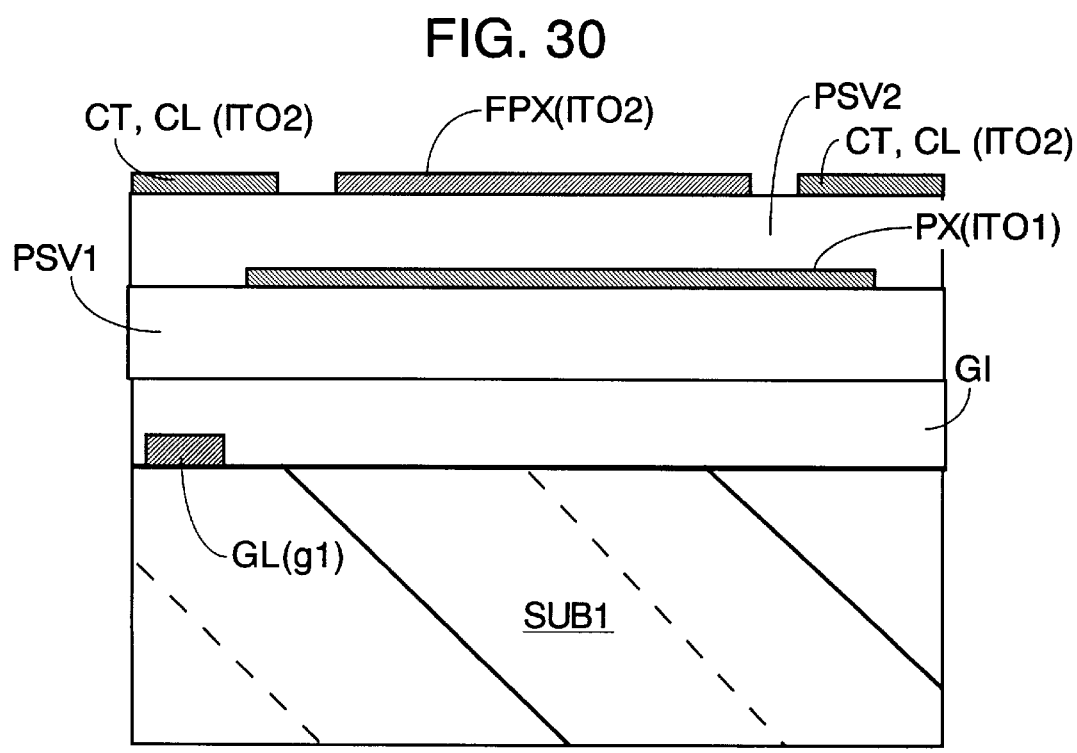
FIG. 30 is a cross-sectional view taken along line 30—30 of FIG. 27.

FIG. 27 is a plan view showing another embodiment of the liquid crystal display device according to the present invention. FIG. 28 is a cross-sectional view taken along line 28—28 of FIG. 27, FIG. 29 is a cross-sectional view taken along line 29—29 of FIG. 27, and FIG. 30 is a cross-sectional view taken along line 30—30 of FIG. 27.

FIG. 27 corresponds to FIG. 1, and the same symbols as those used in FIG. 1 denote the same materials as those used in Embodiment 1.

The construction of Embodiment 5 differs from that shown in FIG. 1 in that the pixel electrode PX is positioned as a layer overlying an insulating layer, while the counter electrode CT is positioned as a layer underlying the insulating layer.

That is to say as shown in FIG. 28, a first protective film PSV1 is formed on the upper surface of the insulating film GI, and the pixel electrode PX made of, for example, an ITO film is formed on the first protective film PSV1.

This pixel electrode PX is a transparent electrode formed over a large part of the pixel area except the periphery thereof, and is connected through a contact hole to the source electrode SD1 of the thin film transistor TFT formed in a layer underlying the first protective film PSV1.

A second protective film PSV2 is formed to cover the pixel electrode PX formed in this manner, and the counter electrodes CT and conductive layers FTC are formed on the upper surface of the second protective film PSV2.

In an area superposed on the pixel electrode PX, the counter electrodes CT are formed as plural strip-shaped electrodes to be extended in the x direction of FIG. 27 and to be juxtaposed in the y direction of FIG. 27. The opposite ends of each of the counter electrodes CT are formed to be connected to a conductive Om which is formed integrally with the counter electrode s CT in the whole area except the area between each of the counter electrodes CT.

In other words, in the area superposed on the pixel electrode PX, the counter electrodes CT are formed by forming openings in the conductive film (ITO) formed to cover at least the entire area of the display area, in such a manner as to hollow out the conductive film (ITO) around the periphery of each of areas in which the respective conductive layers FTC are formed.

In this manner, since the counter electrodes CT and the conductive layers FTC are formed by providing the openings in the conductive film (ITO) formed to cover at least the display area, the conductive films other than those which function as the counter electrodes CT and the conductive layers FTC can be used as the counter voltage signal lines CL. In this case, it is possible to achieve the advantage of reducing the electrical resistance of the entire conductive film.

In addition, the conductive films other than those which function as the counter electrodes CT and the conductive layers FTC can be formed in the state of covering the gate signal lines GL and the drain signal lines DL.

This fact means that the conductive films other than those which function as the counter electrodes CT and the conductive layers FTC can be given the function of a related art black matrix layer.

The reason for this is that an electric field (lateral electric field), which controls the optical transmissivity of the liquid crystal and has a component parallel to the transparent substrate SUB1, occurs between the conductive layers (containing the conductive layers FTC) which function as the counter electrodes CT and the pixel electrode PX, and the lateral electric field does not occur in any other portion.

Accordingly, as shown in FIG. 28, it is not necessary to form a black matrix layer on the transparent substrate SUB2, whereby it is possible to achieve the advantage of reducing the number of manufacturing steps.

Incidentally, in this case, if a normally black type of liquid crystal capable of displaying black with no electric field applied is employed, it is possible to strengthen the black-matrix function of the conductive layers.

The gate signal lines GL or the drain signal lines DL can be restrained from generating capacitances between themselves and the above-described conductive layers. However, on the basis of this fact, if either one of the first protective film PSV1 and the second protective film PSV2 interposed between these signal lines GL and DL and the conductive layers, for example the second protective film PSV2, is formed of a resin film formed by resin application and the thickness of this resin film is made comparatively large, it is possible to reduce the capacitances.

<Embodiment 6>

Figure 31:
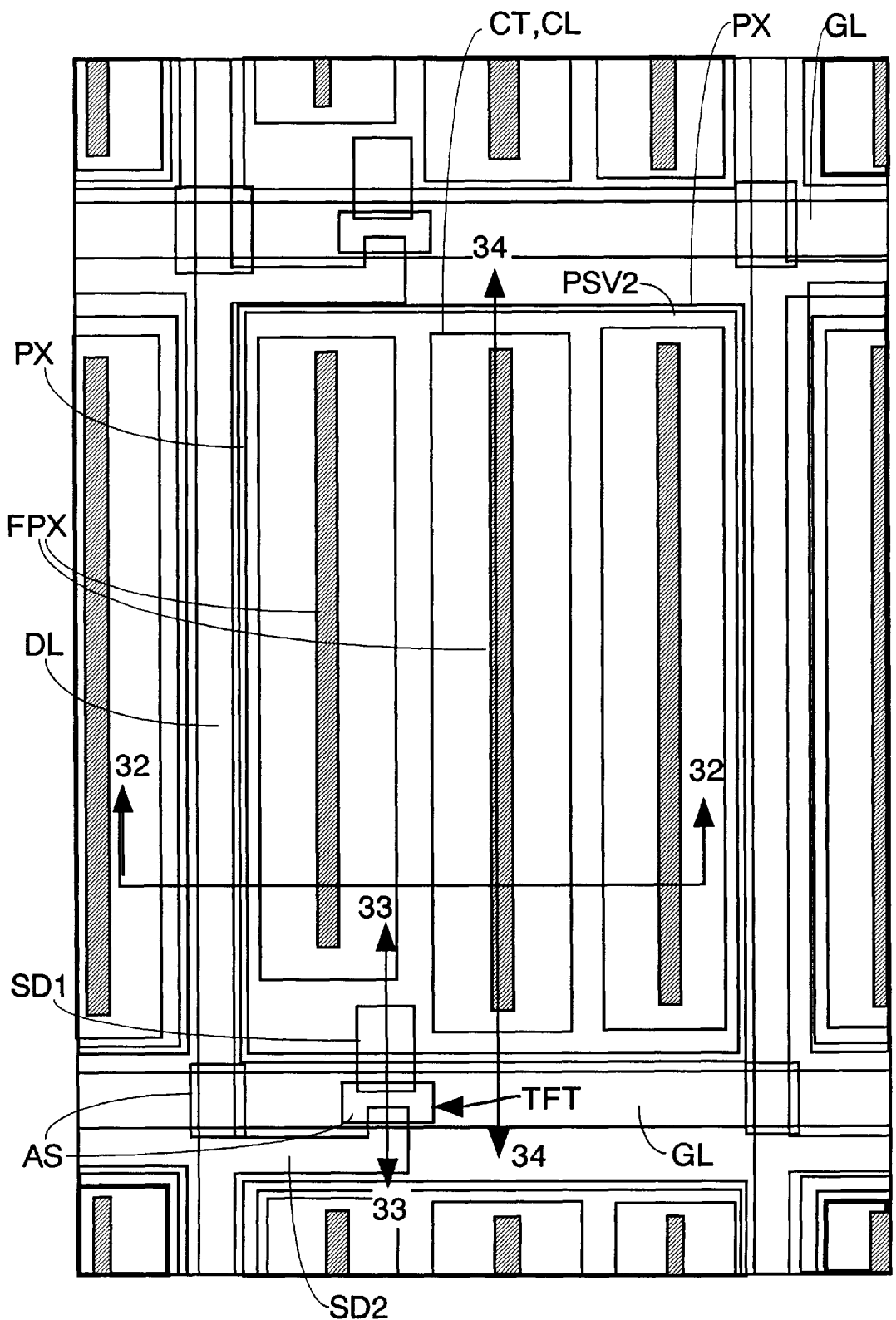
FIG. 31 is a plan view showing another embodiment of the pixel area of the liquid crystal display device according to the invention.
Figure 32:
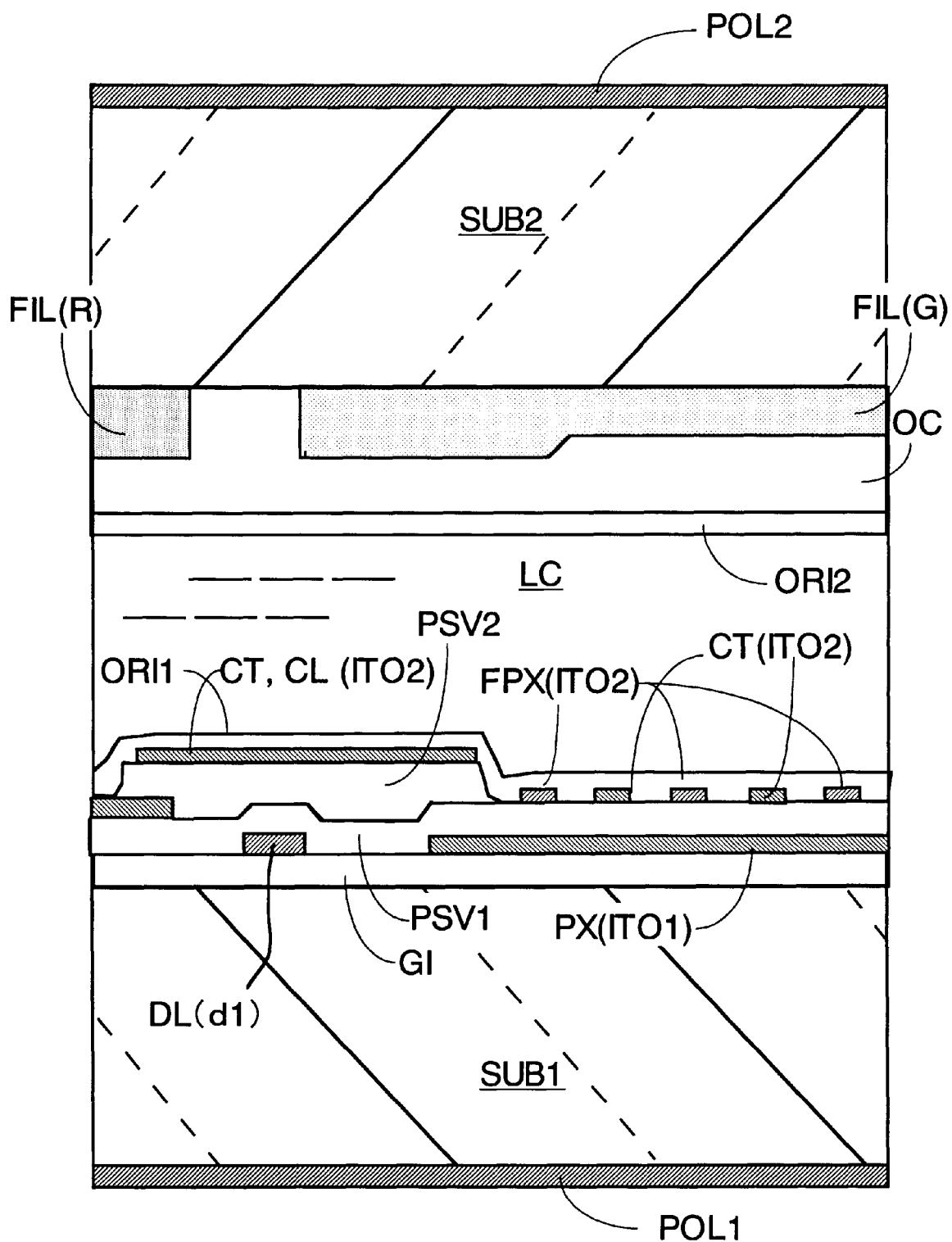
FIG. 32 is a cross-sectional view taken along Line 32—32 of FIG. 31.
Figure 33:
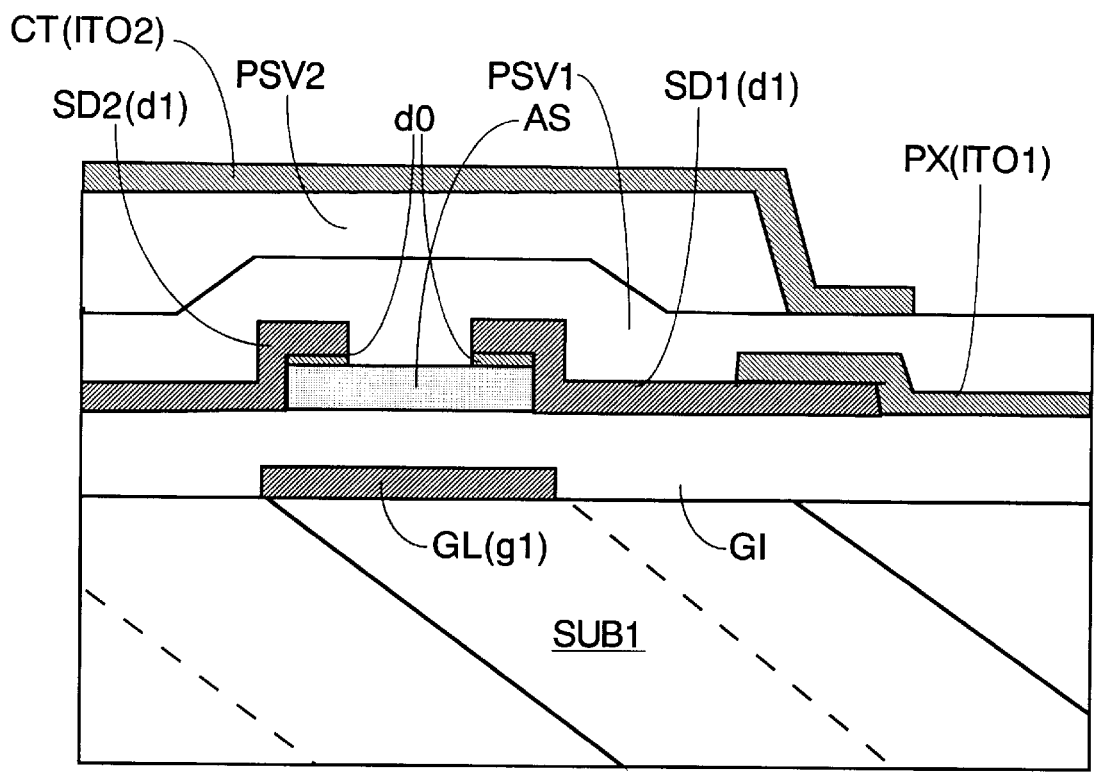
FIG. 33 is a cross-sectional view taken along line 33—33 of FIG. 31.
Figure 34:
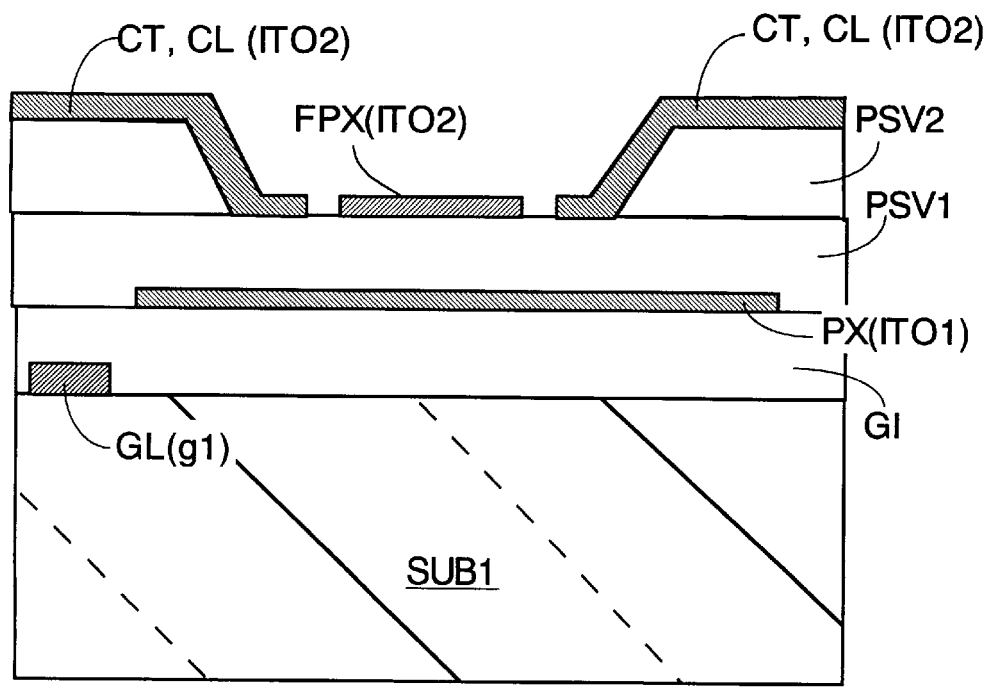
FIG. 34 is a cross-sectional view taken along line 34—34 of FIG. 31.

FIG. 31 is a plan view showing another embodiment of the liquid crystal display device according to the present invention, and FIG. 32 is a cross-sectional view taken along line 32—32 of FIG. 31.

FIGS. 31 and 32 show a construction improved more than Embodiment 5. In FIGS. 31 and 32, the same symbols as those used in FIGS. 27 to 30 denote the same materials as those used in Embodiment 5.

First of all, the construction of Embodiment 6 differs that of Embodiment 5 in that the pixel electrode PX is formed on the insulating film GI and the counter electrodes CT are formed on the first protective film PSV1 formed on the pixel electrode PX.

In other words, the pixel electrode PX and the counter electrodes CIT are formed in different layers with the first protective film PSV1 interposed therebetween.

The second protective film PSV2 is formed in the entire area except the pixel area. This second protective film PSV2 is formed by forming the second protective film PSV2 in at least the entire area of the display area and selectively etching a portion which corresponds to the pixel area.

A conductive film is formed on the surface of the remaining second protective film PSV2. This conductive film is formed integrally with the counter electrodes CT, and as in the case of Embodiment 5, the counter electrodes CT are formed by forming the conductive film over at least the entire display area and forming openings in the conductive film within the area superposed on the pixel electrode PX, in such a manner as to hollow out the conductive film around the periphery of each of the areas in which the respective conductive layers FTC are formed.

The liquid crystal display device constructed in this manner has the advantage of reducing the capacitance between the gate signal lines GL or the drain signal lines DL and the conductive film by interposing the first protective film PSV1 and the second protective film PSV2 between the lines GL or DL and the conductive film, and also has the advantage of generating a stronger electric field between the pixel electrode PX and the counter electrodes CT toward the liquid crystal LC by interposing the first protective film PSV1 between the pixel electrode PX and the counter electrodes CT.

<Comparison of Characteristics of Embodiments 1, 2, 4, 5 and 6>

Figure 35:
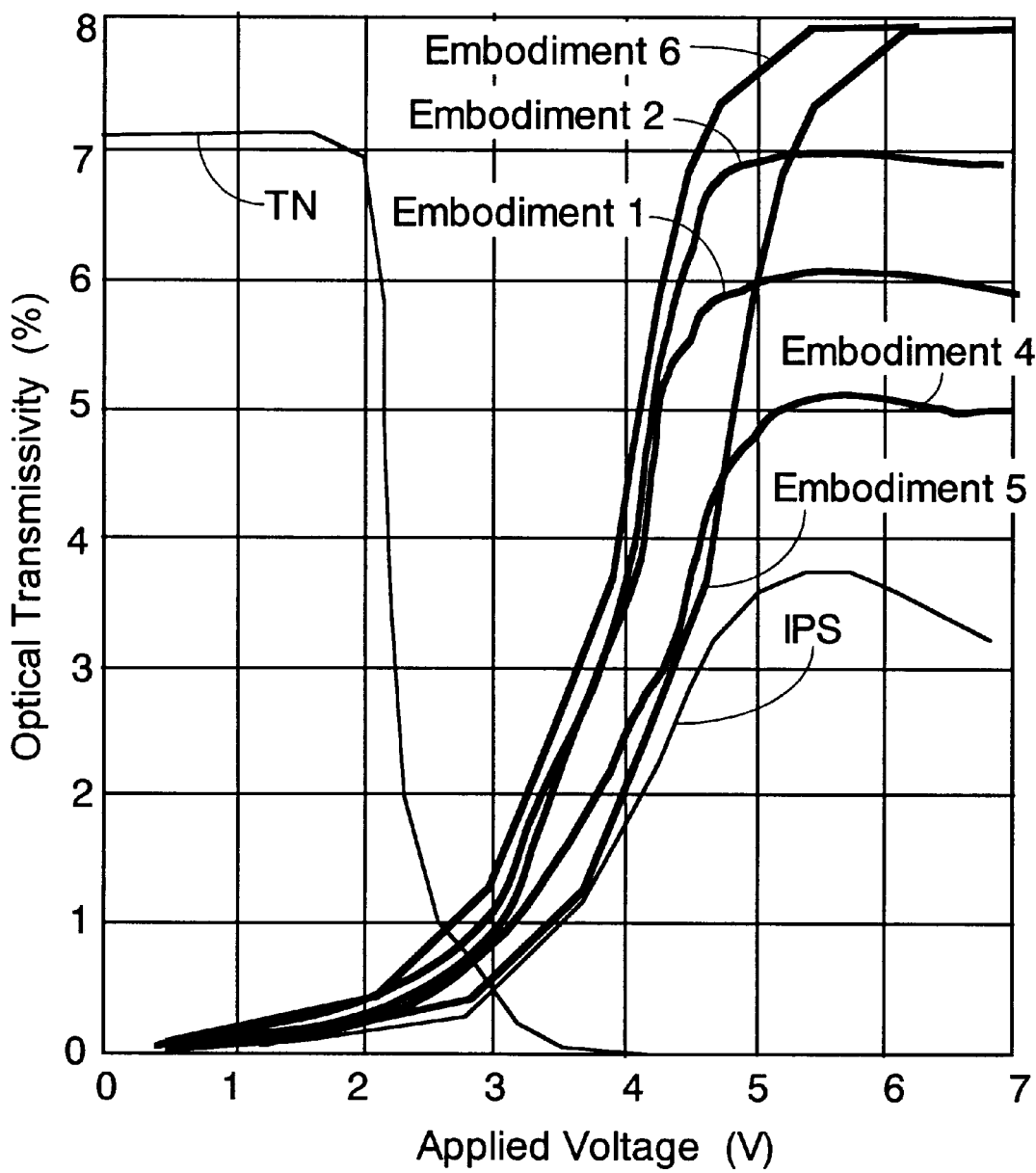
FIG. 35 is a graph showing the characteristic of optical transmissivity versus applied voltage in the liquid crystal display device of each of Embodiments 1, 2, 4, 5 and 6.

FIG. 35 is a graph showing the characteristic of optical transmissivity against applied voltage in the construction of each of Embodiments 1, 2, 4, 5 and 6.

The liquid crystal display device of each of Embodiments 1, 2, 4, 5 and 6 is based on a so-called 14-inch XGA format, and has gate signal lines GL of width 10 $\mu$m and drain signal lines DL of width 8 $\mu$m.

FIG. 35 shows, in addition to the characteristics of Embodiments 1, 2, 4, 5 and 6, the characteristics of a TN type of TFT-LCD and an IPS type of TFT-LCD for the sake of comparison.

It will be understood from FIG. 35 that the aperture ratio is 60% in the case of Embodiment 1, 70% in the case of Embodiment 2, 50% in the case of Embodiment 3, 50% in the case of Embodiment 4, and 80% in the case of each of Embodiments 5 and 6.

The reason why the aperture ratios are particularly high in the case of Embodiments 5 and 6 is that the constructions of Embodiments 5 and 6 need not use a black matrix which has been used in the related art.

The reason why the drive voltage of Embodiment 6 can be made lower than that of Embodiment 5 is that Embodiment 6 has a construction in which the second protective film PSV2 is not formed in the pixel area.

<Embodiment 7>

Figure 36:
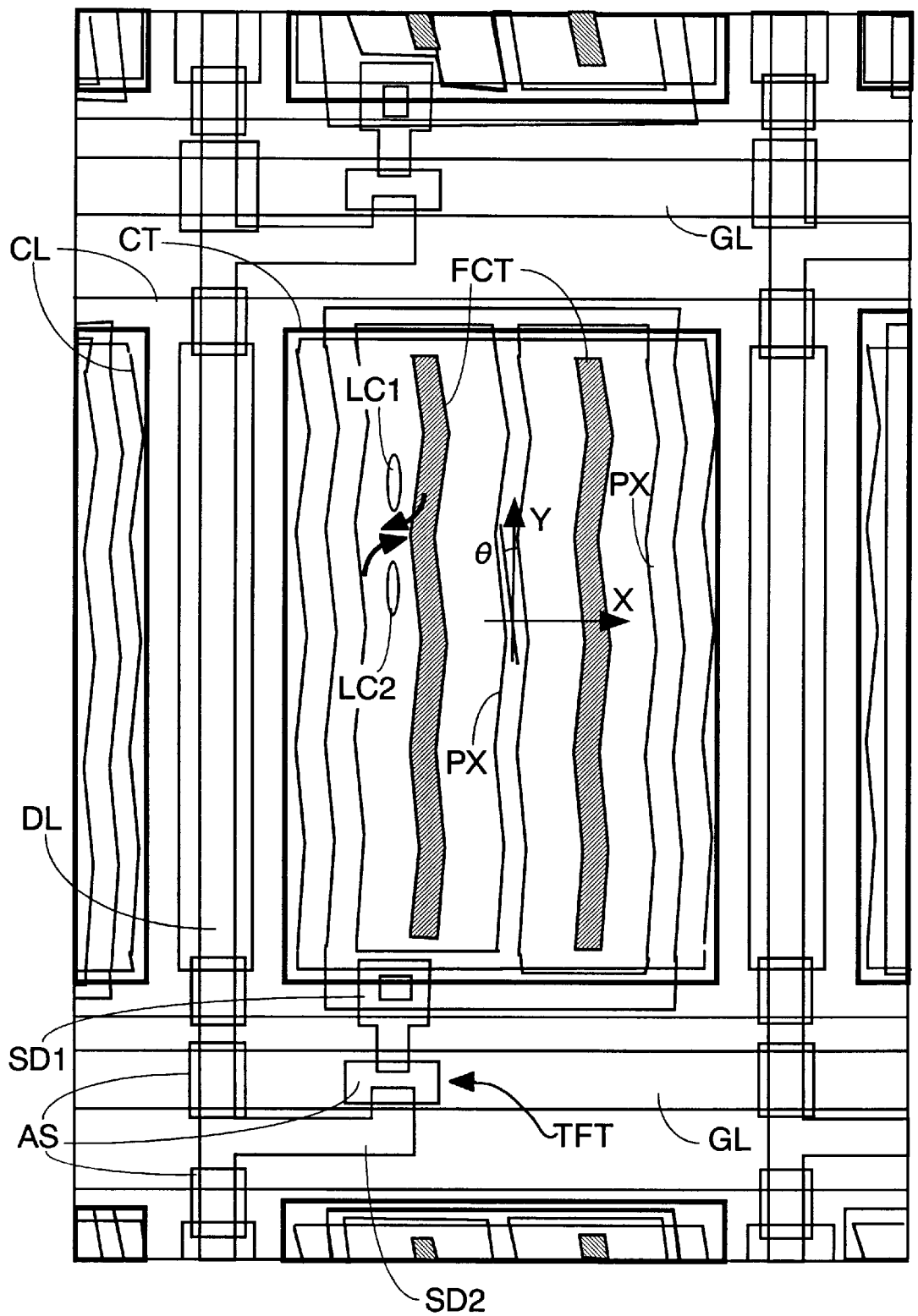
FIG. 36 is a plan view showing another embodiment of the pixel area of the liquid crystal display device according to the invention.

FIG. 36 is a plan view showing another embodiment of the liquid crystal display device according to the present invention, and shows a case in which each of the above-described embodiments is applied to a so-called multi domain type of liquid crystal display device.

The multi-domain scheme relates to an electric field which occurs in a spreading direction of a liquid crystal (lateral electric field). In the multi domain scheme, areas in each of which a lateral electric field occurs in a different direction are formed in each pixel area so that the twist direction of liquid crystal molecules is inverted from area to area, whereby it is possible to provide the advantage of canceling a difference in display color which occurs, for example, when a display area is viewed from each of the right and left sides thereof.

FIG. 36 is a view which corresponds to, for example, FIG. 1. The strip-shaped pixel electrodes PX disposed to be extended in one direction of FIG. 36 and to be juxtaposed in a direction intersecting with the one direction are formed into a zigzag shape by repeating the process of extending the pixel electrodes PX in a direction inclined at an angle θ with respect to the one direction (in the case of a P type liquid crystal, 5–40° is appropriate for the angle θ if the rubbing direction of an alignment film is made coincident with the direction of drain signal lines,) and then bending the pixel electrodes PX by an angle of −2θ and extending the pixel electrodes PX in the bending direction.

Since the floating conductive layers FTC are respectively formed in shapes similar to those of the pixel electrodes PX, the floating conductive layers FTC and the pixel electrodes PX are formed in the zigzag shapes, respectively, but are disposed in parallel with each other.

In this case, since the counter electrode CT is formed over the whole of the pixel area except the periphery thereof, the advantage of the multi domain scheme can be achieved merely by arranging the pixel electrodes PX and the conductive layers FTC which are constructed in the above-described manner, so that the pixel electrodes PX and the conductive layers FTC are superposed on the counter electrode CT.

In particular, it has been confirmed that an electric field which occurs between each of the bent portions of the pixel electrodes PX and the counter electrode CT is completely equivalent to an electric field which occurs between each of the other portion of the pixel electrodes PX and the counter electrode CT. In the related art, the area between each of the bent portions of the pixel electrodes PX and the counter electrode CT is called a disclination area, in which the twist directions of liquid crystal molecules become random and an opaque portion occurs.

Accordingly, Embodiment 7 has the advantage that a problem such as a decrease in optical transmissivity does not occur in the vicinity of any of the bent portions of the pixel electrodes PX.

Although in Embodiment 7 the pixel electrodes PX are formed to be extended in the x direction of FIG. 36, the pixel electrodes PX may be formed to be juxtaposed in the y direction of FIG. 36 and the bent portions may be provided in the pixel electrodes PX so that the advantage of the multi domain scheme can be achieved.

In Embodiment 7, the bent portions are provided in the pixel electrodes PX so that the advantage of the multi domain scheme can be achieved.

However, in a construction in which the pixel electrode PX is formed in at least the entire area of the display area except the periphery thereof and, as shown in FIG. 28 by way of example, the counter electrodes CT are formed to be extended in one direction and to be juxtaposed in a direction intersecting with the one direction, it goes without saying that bent portions may be provided in each of the counter electrodes CT so that the advantage of the multi domain scheme can be achieved.

<Embodiment 8>

Figure 37:
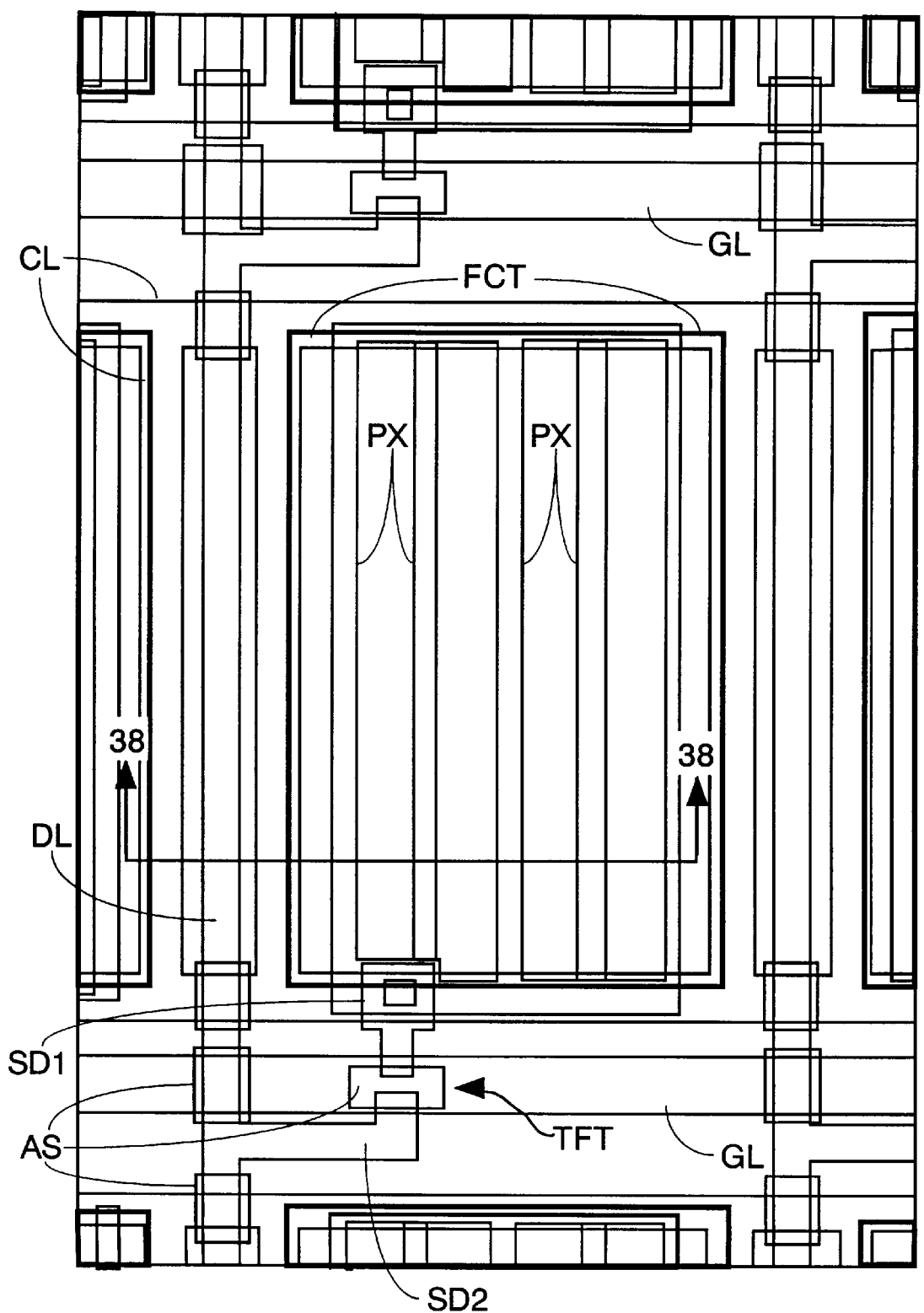
FIG. 37 is a plan view showing another embodiment of the pixel area of the liquid crystal display device according to the invention.
Figure 38:
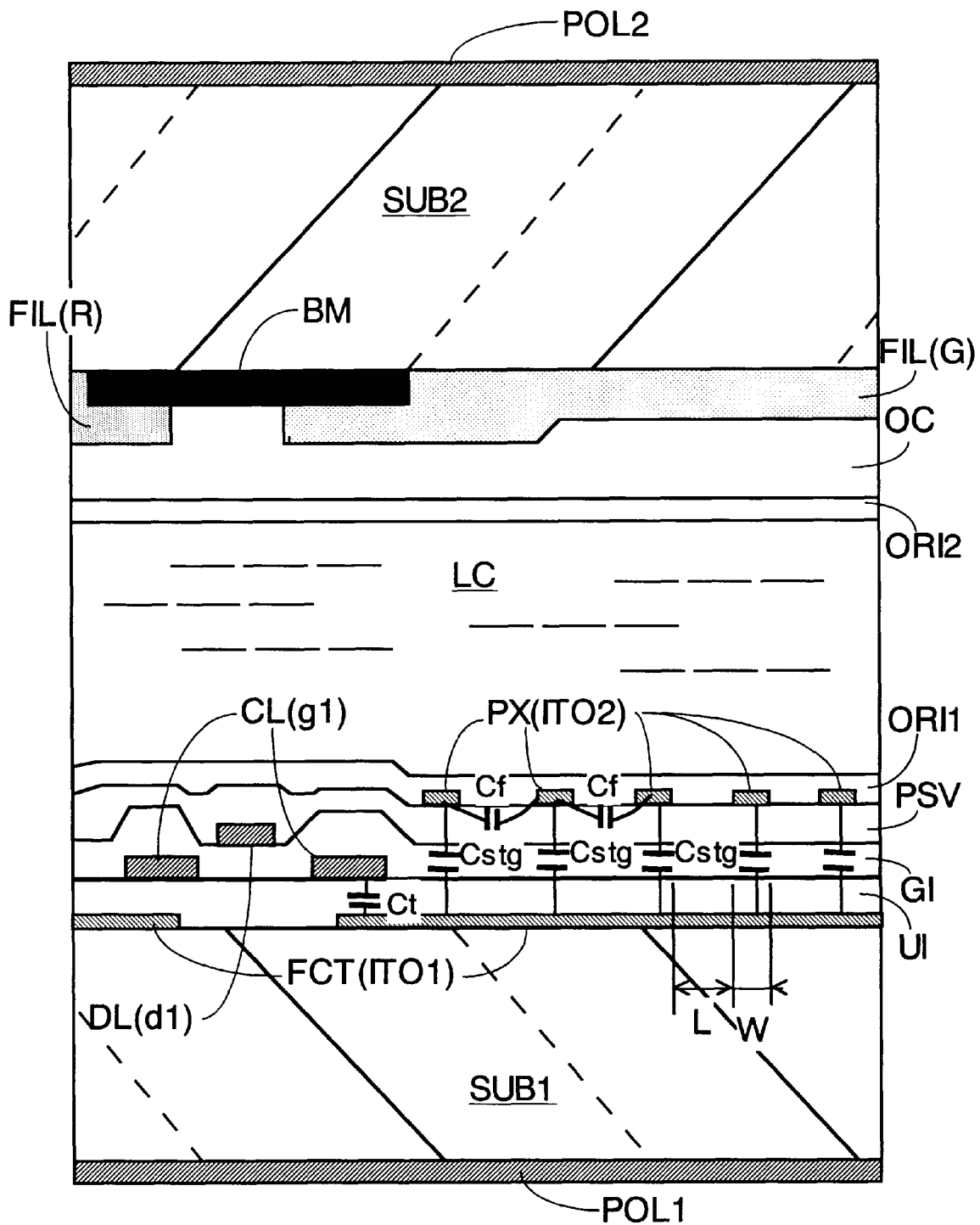
FIG. 38 is a cross-sectional view taken along line 38—38 of FIG. 37.

FIG. 37 is a plan view showing another embodiment of the liquid crystal display device according to the present invention, and FIG. 38 is a cross-sectional view taken along line 38—38 of FIG. 37.

FIGS. 37 and 38 show a construction improved more than Embodiment 5. In FIGS. 37 and 38, the same symbols as those used in FIGS. 1 and 2 denote the same materials as those used in Embodiment 1.

First of all, the construction of Embodiment 8 differs that of Embodiment 1 in that the conductive layer FCT which serves as a counter electrode is formed as a floating conductive layer between the counter voltage signal line CL and the pixel electrodes PX.

In other words, as shown in FIG. 38, this conductive layer FCT is formed under a base insulating film UI which is formed under the layer of the counter voltage signal lines CL and the gate signal lines GL.

As shown in FIG. 37, the counter voltage signal line CL is superposed on a peripheral portion of the conductive layer FCT formed of a transparent conductive layer such as ITO, with the base insulating film UI being interposed therebetween.

In this construction, the potential of the conductive layer FCT can be made closer to that of the counter voltage signal line CL by adjusting the thickness of the base insulating film UI, whereby the conductive layer FCT, although it is in a floating state, can serve the role of a counter electrode and control the optical transmissivity of the liquid crystal display.

By adopting this construction, it is possible to decrease short-circuit defects which, in Embodiment 1, would occur between the counter electrode CT and the pixel electrodes PX with high probability because the area of superposition of the pixel electrodes PX on the counter electrode CT is large.

As shown in FIG. 38, a capacitance to be driven by the thin film transistor TFT has a series-parallel construction made of a capacitance CT of the counter electrode FCT which is in a floating state with respect to counter voltage signal line CL and the capacitances Cstg between the conductive layer FCT and the respective pixel electrodes PX. Accordingly, it is possible to decrease the capacitance to be driven by the thin film transistor TFT.

Incidentally, in each of the above-described embodiments, either one of the pixel electrode PX and the counter electrode CT is formed of a transparent electrode over the entire central area of a display area except at least the periphery thereof the display area being surrounded by the drain signal lines DL and the gate signal lines GL, and the other electrode is formed to be superposed on the transparent electrode.

However, it goes without saying that an opening may be provided in the area of the one electrode that is superposed on the other electrode, or the one electrode may be partly superposed on the other electrode in the vicinity of the opening.

The reason why this is that, even in this construction, there is no change in the distribution of an electric field (lateral electric field) which occurs between the pixel electrode PX and the counter electrode CT.

Although in each of the above-described embodiments both the pixel electrode PX and the counter electrode are formed of transparent electrodes, an opaque electrode may, of course, be used for either one of the pixel electrode PX and the counter electrode.

In other words, it is possible to adopt another embodiment in which a counter electrode is formed of a transparent electrode over the entire central area of a display area except at least the periphery thereof, the display area being surrounded by drain signal lines DL and gate signal lines GL, and a pixel electrode made of an opaque electrode is formed to be superposed on the counter electrode.

Even if the liquid crystal display device is constructed in this manner, the technical advantage of any of the embodiments does not change at all.

As is apparent from the foregoing description, in accordance with the liquid crystal display device according to the present invention, it is possible to reduce drive voltage and reduce the load capacitances of thin film transistors.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:

a pixel electrode and a counter electrode which are respectively disposed in different layers in a liquid crystal-side pixel area of one of transparent substrates disposed to oppose each other with a liquid crystal interposed therebetween, the counter electrode causing an electric field having a component parallel to the transparent substrates to be generated between the counter electrode and the pixel electrode, one of the pixel electrode and the counter electrode being formed as a layer closer to the liquid crystal than the other electrode is to the liquid crystal, the other electrode being formed as a transparent electrode extending outwardly from at least a periphery of an area on which the one electrode is superposed, and a conductive layer being formed which is capacitive-coupled between the pixel electrode and the counter electrode, wherein the conductive layer which is a capacitive-coupled is formed as a layer closer to the liquid crystal than the other electrode is to the liquid crystal.

2. A liquid crystal display device comprising:

a pair of electrodes which are respectively formed in different layers of a liquid crystal-side pixel area of one of a pair of transparent substrates disposed to oppose each other with a liquid crystal interposed therebetween, one of the pair of electrodes being transparent and formed in plane view over the entire central area of the liquid crystal-side pixel area except at least a periphery thereof, the other of the pair of electrodes being formed closer to the liquid crystal than the one of the pair of electrodes is to the liquid crystal, a floating electrode being formed adjacently to the other of the pair of electrodes and on a side closer to the liquid crystal than the other of the pair of electrodes is to the liquid crystal.

3. A liquid crystal display device comprising:

a pair of electrodes which are respectively formed in different layers of a liquid crystal side pixel area of one of a pair of transparent substrates disposed to oppose each other with a liquid crystal interposed therebetween, one of the pair of electrodes being transparent and formed in plane view over the entire central area of the liquid crystal-side pixel area except at least a periphery thereof, the other of the pair of electrodes being formed closer to the liquid crystal than the one of the pair of electrodes is to the liquid crystal, a floating electrode being formed in the same layer as the other of the pair of electrodes.

4. A liquid crystal display device comprising in a liquid crystal-side pixel area of one of transparent substrates disposed to oppose each other with a liquid crystal interposed therebetween:

a first electrode;

a second electrode formed in a layer which underlies the first electrode with an insulating film interposed therebetween, the second electrode causing an electric field having a component parallel to the transparent substrates to be generating between the first electrode and the second electrode; and a third electrode disposed adjacently to the first electrode and formed in a layer which overlies the second electrode, the second electrode being formed of a transparent electrode formed in an area which is a peripheral portion of the first electrode and is not superposed on at least the first electrode, the third electrode being constructed as an electrode to which no voltage is applied.

5. A liquid crystal display device according to claim 4, wherein each of the first electrode and the third electrode is made of a transparent electrode.

6. A liquid crystal display device comprising in a liquid crystal-side pixel area of one of transparent substrates disposed to oppose each other with a liquid crystal interposed therebetween:

a pixel electrode and a counter electrode formed to be disposed with an insulating film interposed therebetween, an electric field having a component parallel to the transparent substrates being generated between the pixel electrode and the counter electrode, one of the pixel electrode and the counter electrode being formed in a layer closer to the liquid crystal than the other electrode is to the liquid crystal, the other electrode being formed of a transparent electrode formed in an area which is a peripheral portion of the one electrode and is not superposed on at least the one electrode; and a floating electrode formed adjacently to the one electrode in a layer closer to the liquid crystal than the other electrode is to the liquid crystal.

7. A liquid crystal display device according to claim 6, wherein the other electrode is formed over the entire central area of the liquid crystal-side pixel area except a periphery thereof, the one electrode and the floating electrode being disposed to be extended in one direction and to be alternately juxtaposed in a direction intersecting with the one direction.

* * * * *